United States Patent
Poe et al.

(10) Patent No.: US 8,529,247 B2
(45) Date of Patent: Sep. 10, 2013

(54) COANDA GAS BURNER APPARATUS AND METHODS

(75) Inventors: Roger L. Poe, Beggs, OK (US); James Wilkins, Fleet (GB); Michael G. Claxton, Tulsa, OK (US)

(73) Assignee: John Zink Company, LLC, Tulsa, OK (US)

( * ) Notice: Subject to any disclaimer, the term of this patent is extended or adjusted under 35 U.S.C. 154(b) by 0 days.

(21) Appl. No.: 13/433,070

(22) Filed: Mar. 28, 2012

(65) Prior Publication Data

US 2012/0189967 A1     Jul. 26, 2012

Related U.S. Application Data

(62) Division of application No. 13/012,723, filed on Jan. 24, 2011, now abandoned, which is a division of application No. 11/454,071, filed on Jun. 14, 2006, now Pat. No. 7,878,798.

(51) Int. Cl.
    *F23D 14/02*     (2006.01)

(52) U.S. Cl.
    USPC ............................ 431/116; 431/115; 431/354

(58) Field of Classification Search
    USPC ................. 431/354, 351, 114, 115, 116, 202, 431/159, 181, 278, 4, 5, 8, 9; 137/343, 806
    See application file for complete search history.

(56) References Cited

U.S. PATENT DOCUMENTS

| | | |
|---|---|---|
| 2,052,869 A | 9/1936 | Coanda |
| 2,108,652 A | 2/1938 | Coanda |
| 2,131,472 A | 9/1938 | Coanda |
| 2,157,281 A | 5/1939 | Coanda |
| 2,173,549 A | 9/1939 | Coanda |
| 2,173,550 A | 9/1939 | Coanda |
| 2,187,342 A | 1/1940 | Coanda |
| 2,198,655 A | 4/1940 | Coanda |

(Continued)

FOREIGN PATENT DOCUMENTS

| | | |
|---|---|---|
| DE | 1910115 | 9/1970 |
| DE | 40 01 378 A1 | 7/1991 |

(Continued)

OTHER PUBLICATIONS

John Zink Company, LLC, author unknown, COANDA Flares, pp. 1 and 2, Jan. 19, 2008, www.johnzink.com/products/flares/html/flar_prod_cof.htm.

(Continued)

*Primary Examiner* — Alfred Basichas
(74) *Attorney, Agent, or Firm* — McAfee & Taft

(57) ABSTRACT

A gas burner apparatus for discharging a mixture of fuel gas, air and flue gas into a furnace space of a furnace wherein the mixture is burned and flue gas having a low content of nitrous oxides and carbon monoxide is formed is provided. The burner tile includes at least one gas circulation port extending though the wall of the tile. The interior surface of the wall of the tile includes a Coanda surface. Fuel gas and/or flue gas conducted through the gas circulation port follows the path of the Coanda surface which allows more flue gas to be introduced into the stream. The exterior surface of the wall of the tile also includes a Coanda surface for facilitating the creation of a staged combustion zone. Also provided are improved burner tiles, improved gas tips and methods of burning a mixture of air, fuel gas and flue gas in a furnace space.

26 Claims, 14 Drawing Sheets

(56) References Cited

U.S. PATENT DOCUMENTS

| | | |
|---|---|---|
| 2,699,644 A | 1/1955 | Coanda |
| 2,770,501 A | 11/1956 | Coanda |
| 2,796,147 A | 6/1957 | Coanda |
| 2,803,591 A | 8/1957 | Coanda et al. |
| 2,907,557 A | 10/1959 | Coanda |
| 2,918,117 A | 12/1959 | Griffin |
| 2,920,448 A | 1/1960 | Coanda |
| 2,939,654 A | 6/1960 | Coanda |
| 2,964,306 A | 12/1960 | Coanda |
| 2,988,139 A | 6/1961 | Coanda |
| 2,988,303 A | 6/1961 | Coanda |
| 2,990,103 A | 6/1961 | Coanda et al. |
| 3,047,208 A | 7/1962 | Coanda |
| 3,261,162 A | 7/1966 | Coanda |
| 3,284,318 A | 11/1966 | Coanda et al. |
| 3,321,891 A | 5/1967 | Coanda |
| 3,337,121 A | 8/1967 | Coanda |
| 3,410,758 A | 11/1968 | Coanda |
| 3,685,614 A | 8/1972 | Coanda et al. |
| 3,817,685 A | 6/1974 | Joannes |
| 3,822,983 A | 7/1974 | Proctor et al. |
| 3,954,382 A | 5/1976 | Hirose |
| 4,021,189 A | 5/1977 | Swann et al. |
| 4,037,991 A | 7/1977 | Taylor |
| 4,069,977 A | 1/1978 | Vaughan, III |
| 4,073,613 A | 2/1978 | Desty |
| 4,078,498 A | 3/1978 | Futer |
| 4,078,587 A | 3/1978 | Jackson |
| 4,099,908 A | 7/1978 | Beckmann et al. |
| 4,146,197 A | 3/1979 | Grotz |
| 4,261,516 A | 4/1981 | Tillman |
| 4,266,142 A | 5/1981 | Crawford |
| 4,336,017 A | 6/1982 | Desty |
| 4,341,643 A | 7/1982 | Brodoff |
| 4,348,168 A | 9/1982 | Coulon |
| 4,392,621 A | 7/1983 | Viets |
| 4,405,296 A | 9/1983 | Stuck et al. |
| 4,442,986 A | 4/1984 | Rousseau |
| 4,446,695 A | 5/1984 | Burtis |
| 4,464,110 A | 8/1984 | Boden et al. |
| 4,478,378 A | 10/1984 | Capuani |
| 4,486,167 A | 12/1984 | McMurray et al. |
| 4,537,371 A | 8/1985 | Lawhorn et al. |
| 4,568,042 A | 2/1986 | Carr |
| 4,579,300 A | 4/1986 | Carr |
| 4,634,370 A | 1/1987 | Chesters |
| 4,634,372 A | 1/1987 | Allum et al. |
| 4,643,669 A | 2/1987 | Bozai |
| 5,067,509 A | 11/1991 | Hunter |
| 5,085,039 A | 2/1992 | Shekleton |
| 5,097,660 A | 3/1992 | Shekleton |
| 5,180,302 A | 1/1993 | Schwartz et al. |
| 5,195,884 A | 3/1993 | Schwartz et al. |
| 5,238,395 A | 8/1993 | Schwartz et al. |
| 5,275,552 A | 1/1994 | Schwartz et al. |
| 5,284,438 A | 2/1994 | McGill et al. |
| 5,293,946 A | 3/1994 | Besson et al. |
| 5,545,063 A | 8/1996 | Haynes |
| 5,601,047 A | 2/1997 | Shen |
| 5,658,141 A | 8/1997 | Larquet et al. |
| 5,732,478 A | 3/1998 | Chapman et al. |
| 5,749,161 A | 5/1998 | Jones |
| 5,884,360 A | 3/1999 | Palffy |
| 5,944,506 A | 8/1999 | Kamal et al. |
| 5,957,682 A | 9/1999 | Kamal et al. |
| 5,974,802 A | 11/1999 | Blake |
| 6,000,635 A | 12/1999 | Justice |
| 6,039,269 A | 3/2000 | Mandzukic |
| 6,234,169 B1 | 5/2001 | Bulbrook et al. |
| 6,240,911 B1 | 6/2001 | Patrick |
| 6,383,462 B1 | 5/2002 | Lang |
| 6,461,145 B1 | 10/2002 | Giraud et al. |
| 6,616,442 B2 | 9/2003 | Venizelos et al. |
| 6,695,609 B1 | 2/2004 | Chung et al. |
| 6,729,874 B2 | 5/2004 | Poe et al. |
| 7,025,590 B2 | 4/2006 | Bussman et al. |
| 7,153,129 B2 | 12/2006 | Bussman et al. |
| 7,198,482 B2 | 4/2007 | Chung et al. |
| 7,244,119 B2 | 7/2007 | Chung et al. |
| 7,318,381 B2 | 1/2008 | Arnold et al. |
| 7,878,798 B2 | 2/2011 | Poe et al. |
| 2006/0105276 A1 | 5/2006 | Wilkins et al. |

FOREIGN PATENT DOCUMENTS

| | | |
|---|---|---|
| EP | 1 867 923 A3 | 4/2008 |
| GB | 1172726 | 12/1969 |
| GB | 1303266 | 1/1973 |
| JP | 5-215312 | 8/1993 |
| JP | 10122514 A | 5/1998 |

OTHER PUBLICATIONS

Rexresearch.com, author unknown, The COANDA Effect—US Patents, pp. 1-31, Jun. 30, 2005, www.rexresearch.com/Coanda/1coanda.htm.

Office Action dated Oct. 19, 2010 in corresponding Australian application No. 2007202730, John Zink Company, LLC.

Office Action dated Jan. 24, 2008 in corresponding EP application No. 07252382.2, John Zink Company, LLC.

Office Action dated Mar. 11, 2008 in corresponding EP application No. 07252382.2, John Zink Company, LLC.

Office Action dated Nov. 10, 2008 in corresponding EP application No. 07252382.2, John Zink Company, LLC.

Office Action dated May 27, 2010 in corresponding EP application No. 07252382.2, John Zink Company, LLC.

Office Action dated Sep. 30, 2009 in corresponding Canadian application No. 2,591,458, John Zink Company, LLC.

Office Action dated May 17, 2010 in corresponding Canadian application No. 2,591,458, John Zink Company, LLC.

Office Action dated May 11, 2009 in corresponding Chinese application No. 200710138849.5, John Zink Company, LLC.

Office Action dated Jan. 11, 2010 in corresponding Chinese application No. 200710138849.5, John Zink Company, LLC.

Office Action dated Aug. 21, 2009 in corresponding Mexican application No. MX/a/2007/007109, John Zink Company, LLC (English translation only).

Office Action dated Apr. 26, 2010 in corresponding Mexican application No. MX/a/2007/007109, John Zink Company, LLC (English translation only).

Office Action dated Oct. 11, 2011 in corresponding Japanese application No. 2007-156048, John Zink Company, LLC (English translation only).

Office Action dated Jul. 26, 2012 in corresponding Canadian application 2,725,869, John Zink Company, LLC.

Office Action dated Dec. 13, 2012 in corresponding Korean application No. 10-2007-0058611, John Zink Company, LLC (and corresponding English translation).

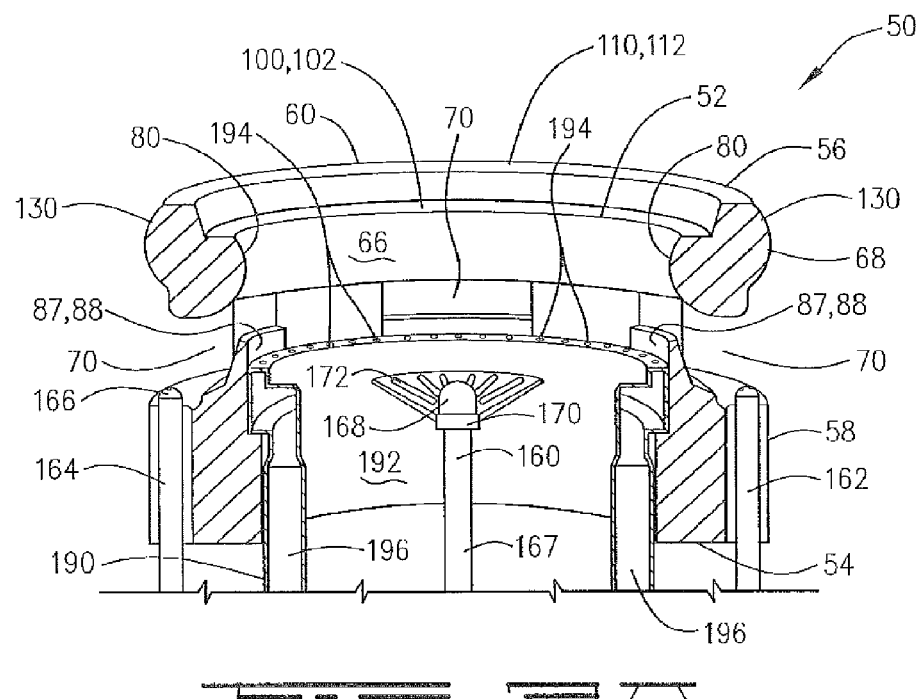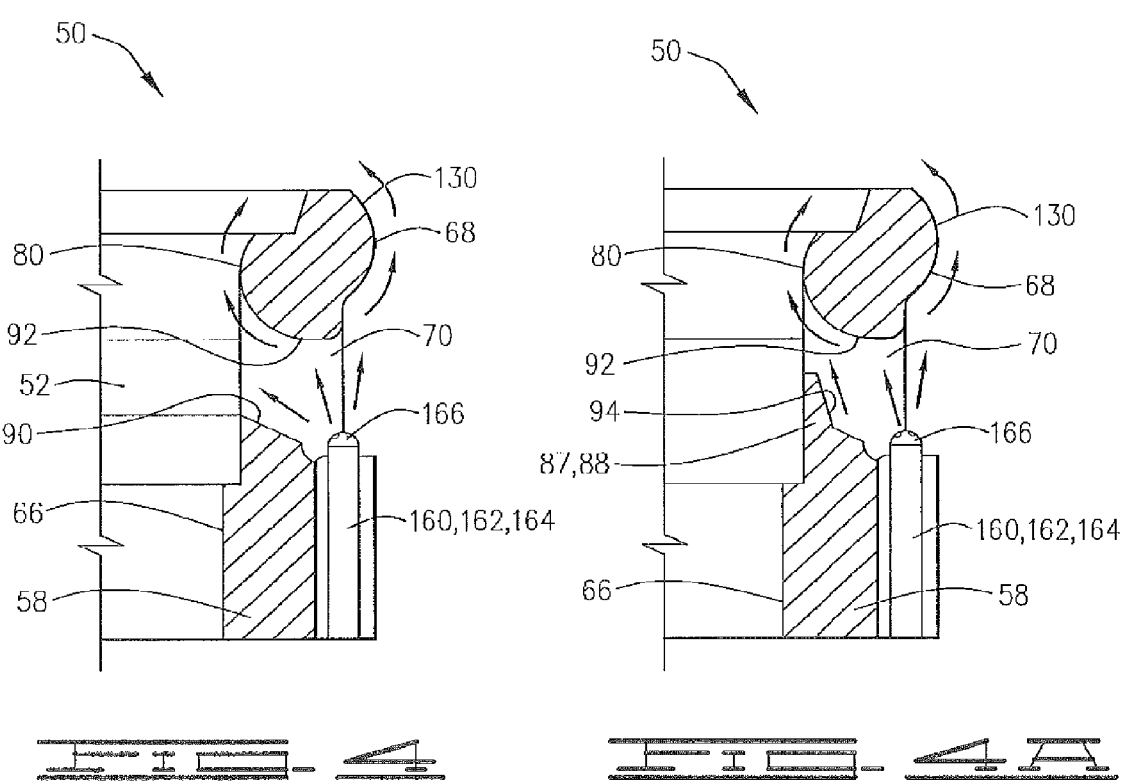

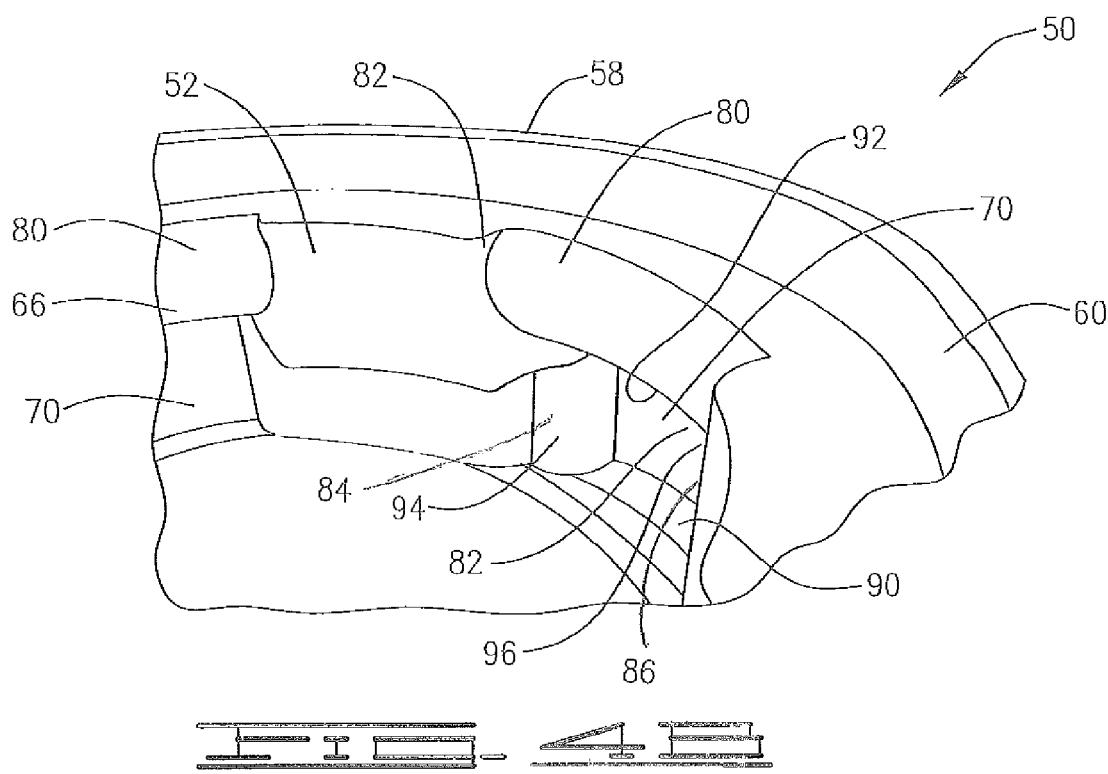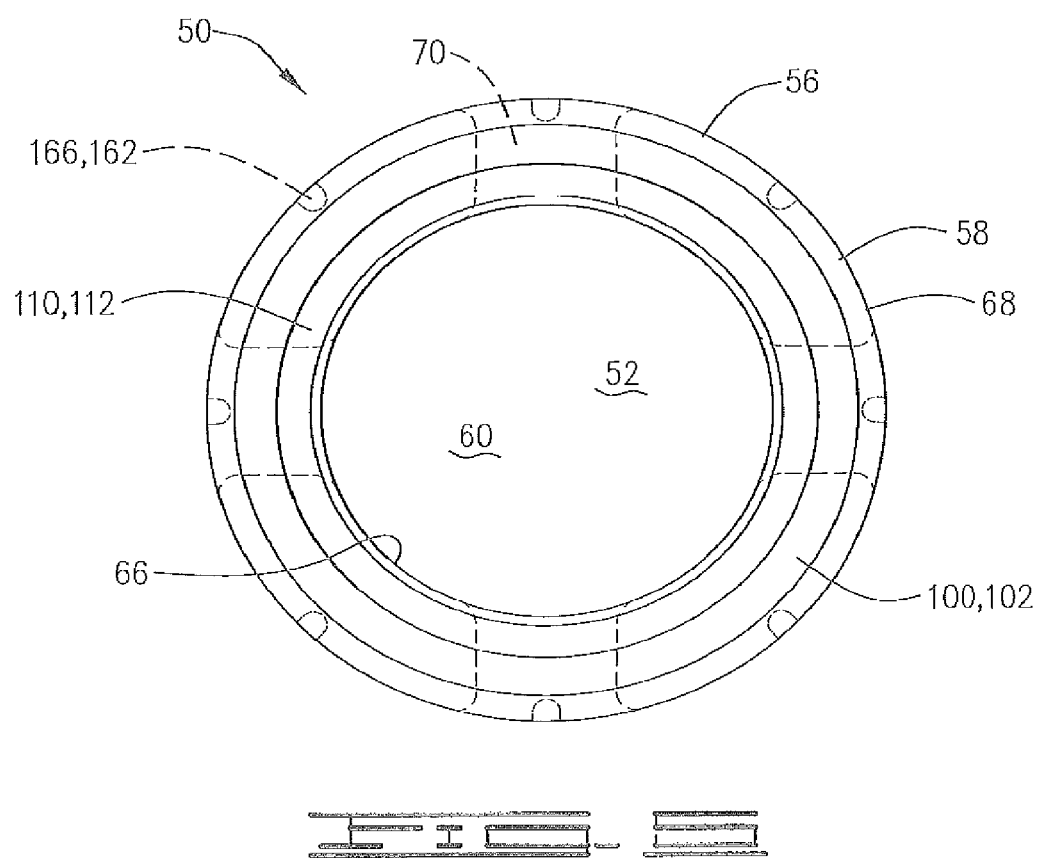

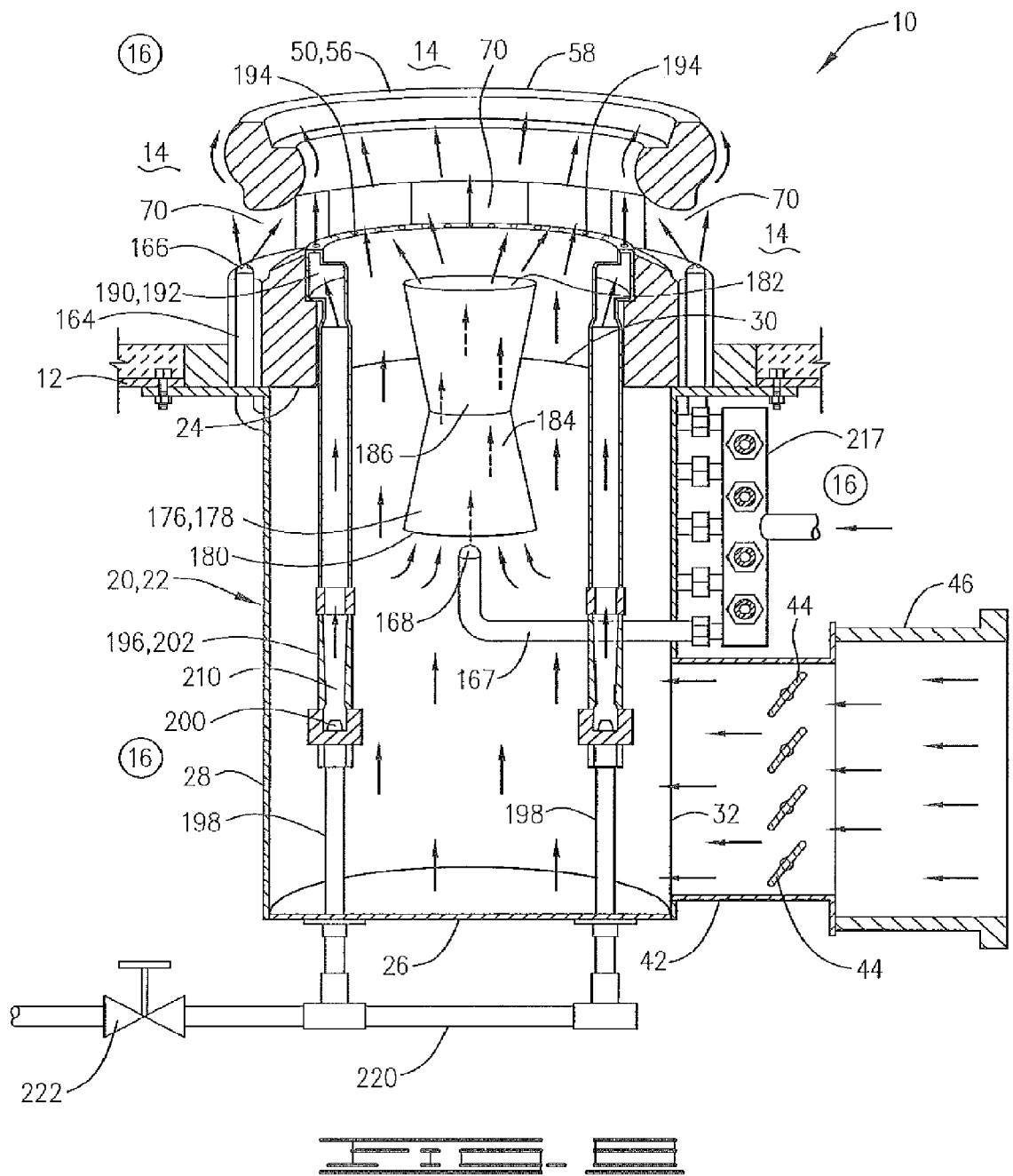

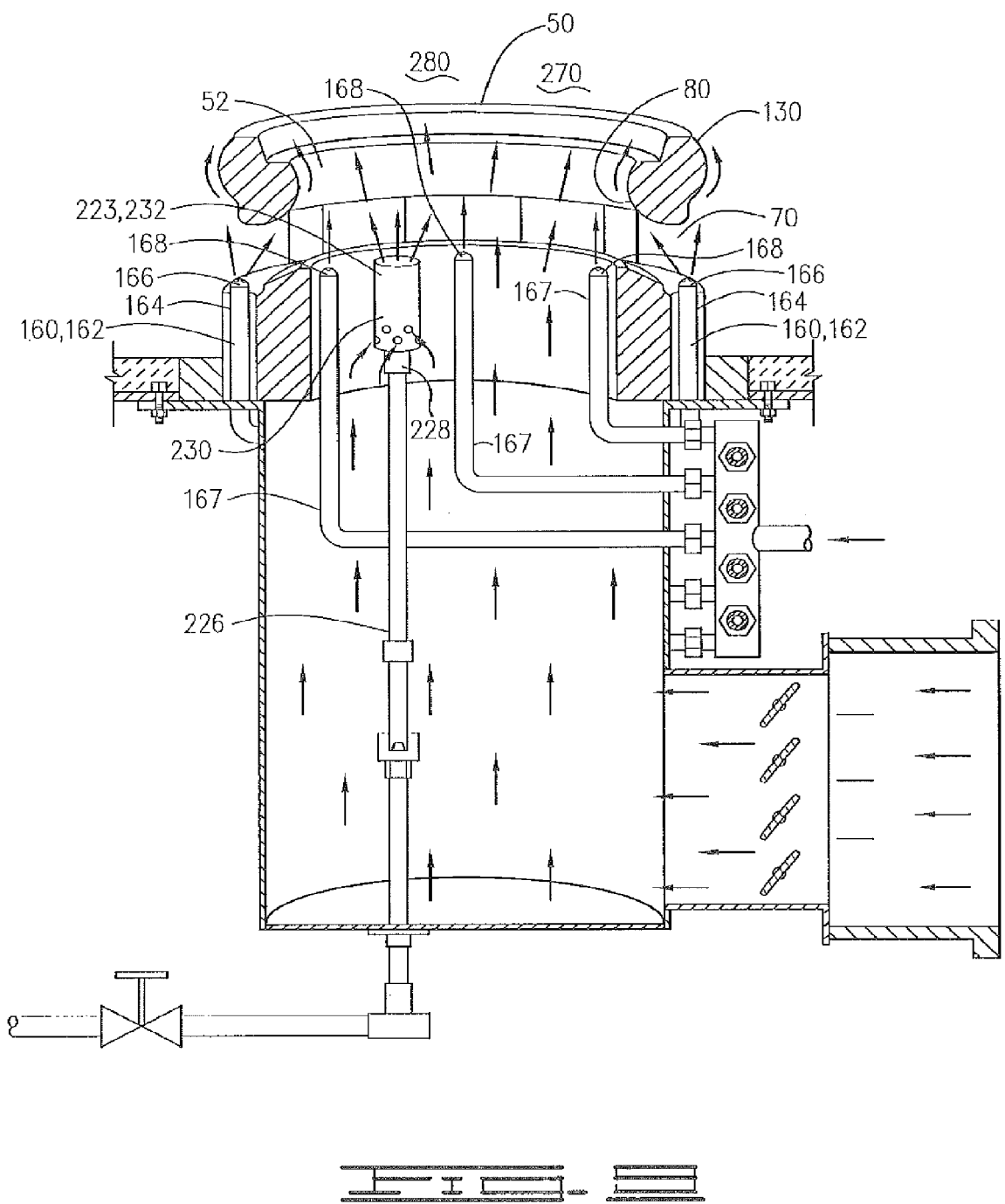

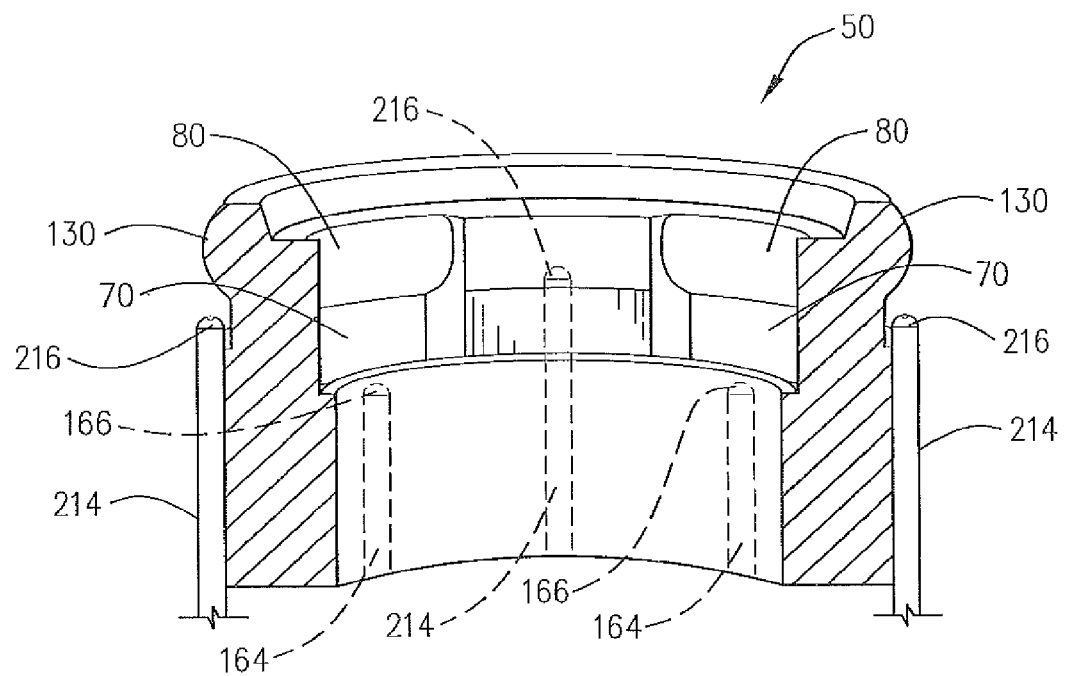
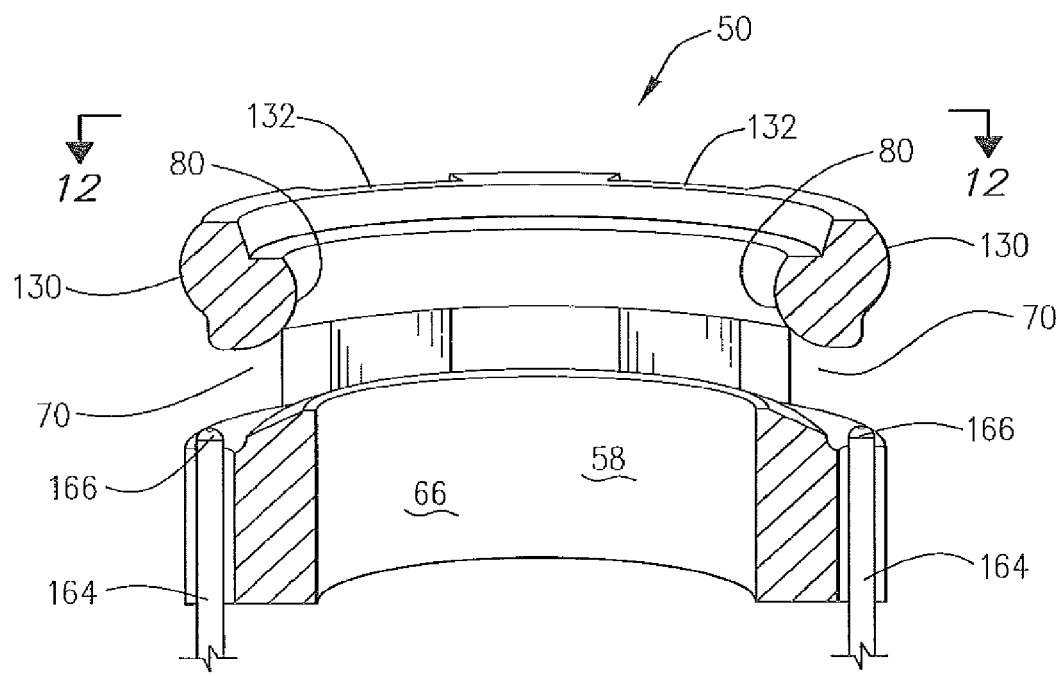

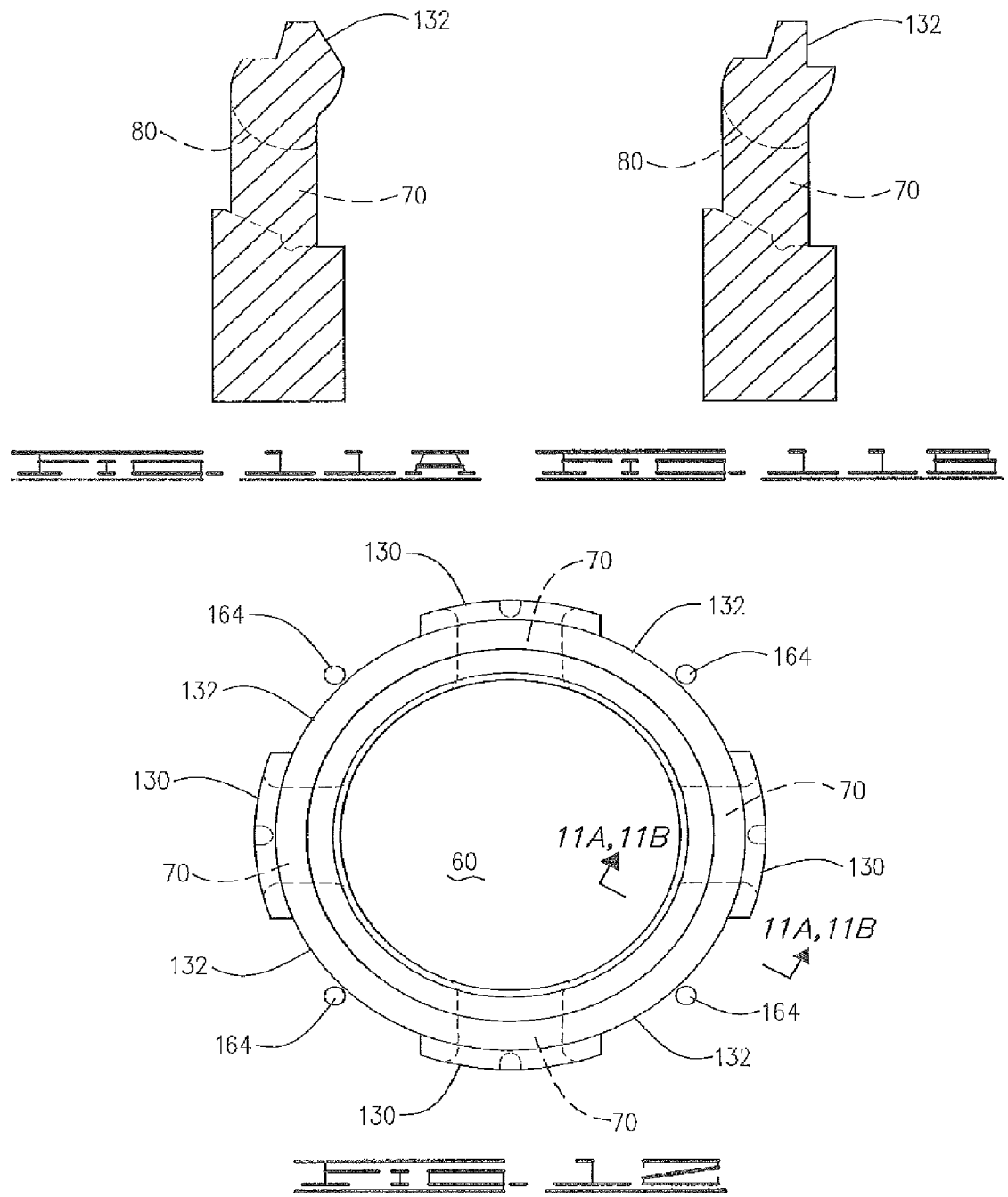

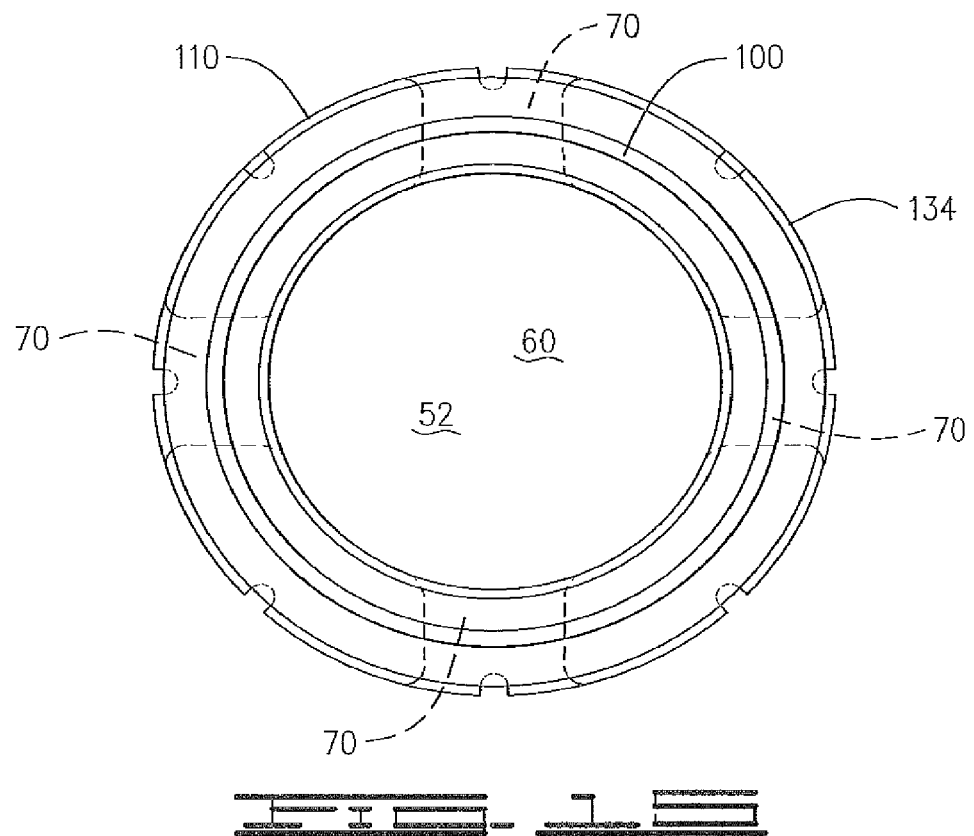
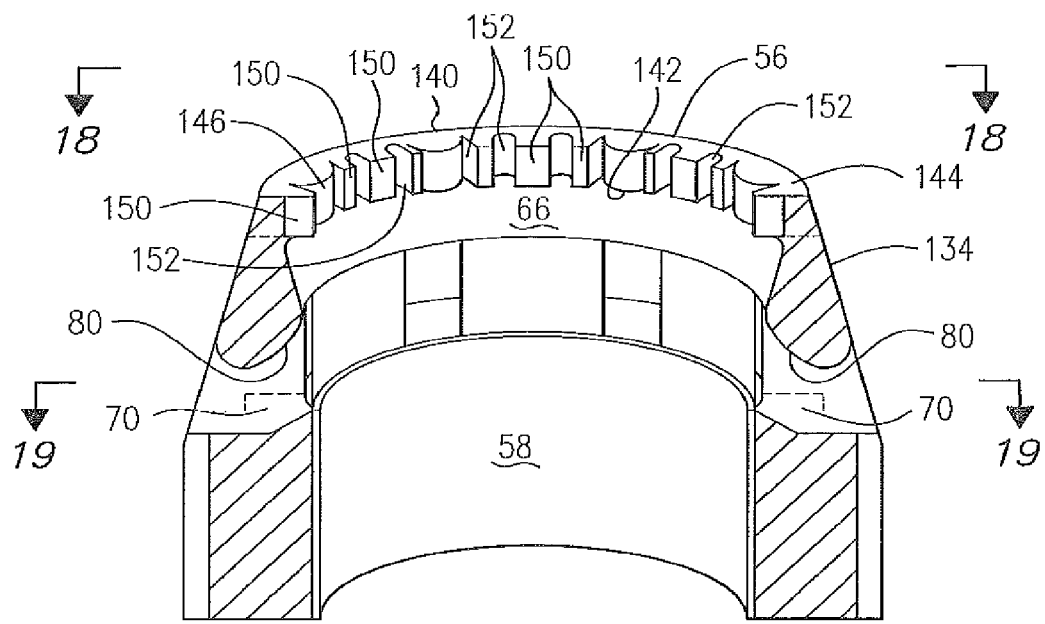

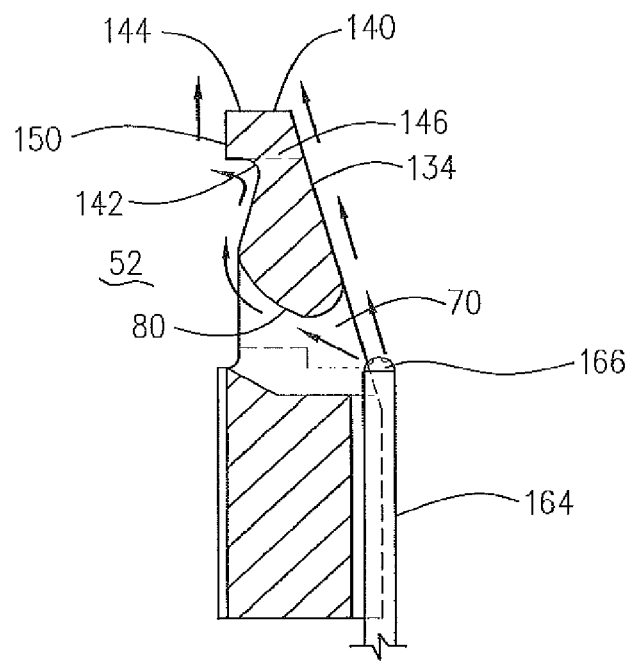
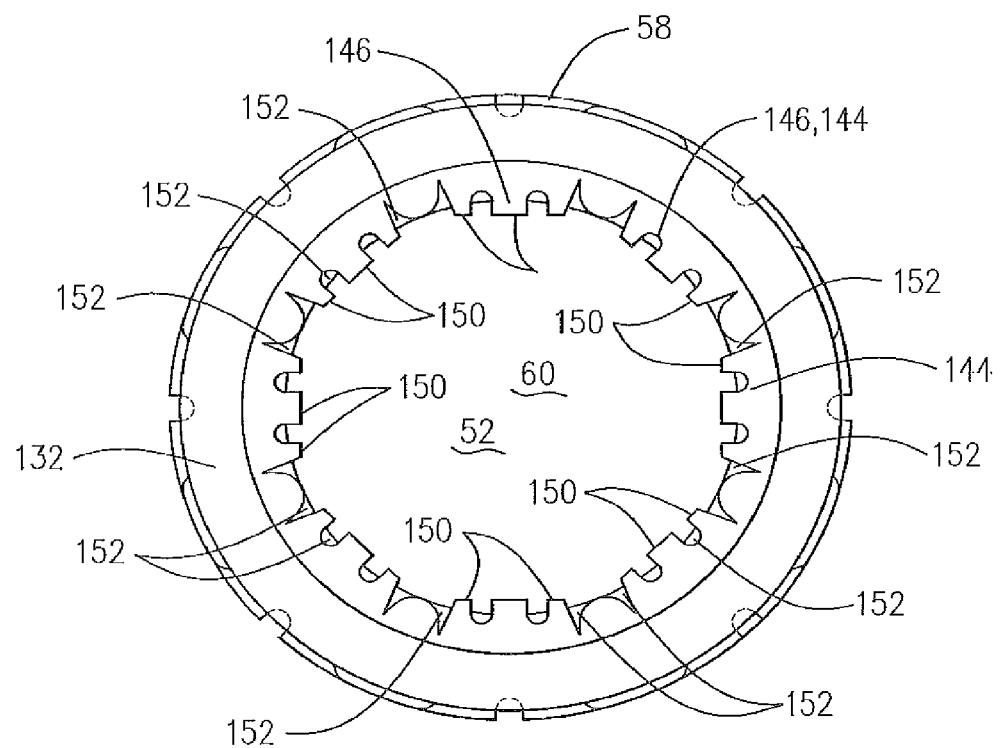

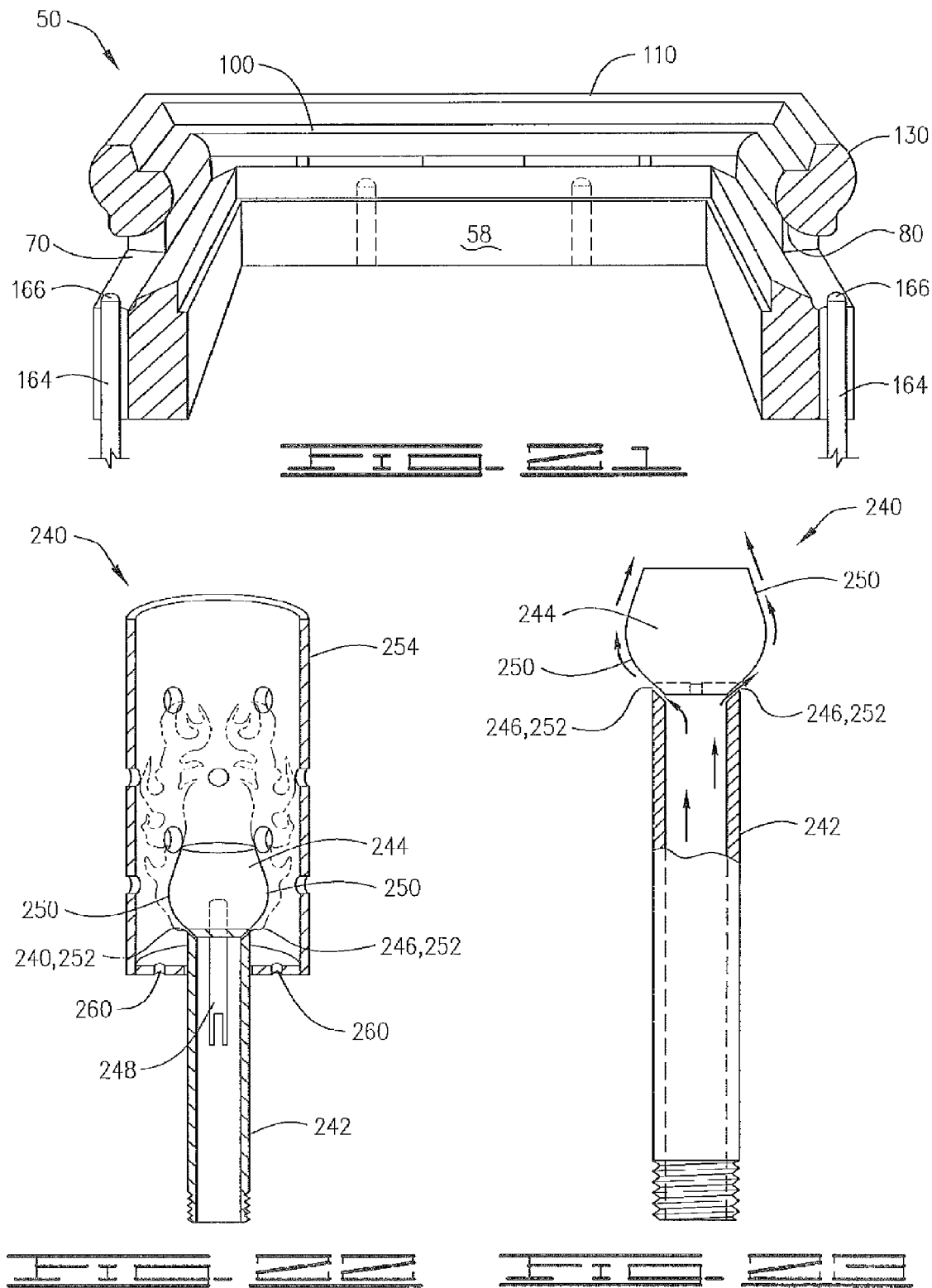

COANDA GAS BURNER APPARATUS AND METHODS

This Application is a Division of application Ser. No. 13/012,723, filed Jan. 24, 2011, which is a Division of application Ser. No. 11/454,071, filed Jun. 14, 2006 (Now U.S. Pat. No. 7,878,798)

BACKGROUND OF THE INVENTION

The present invention relates to gas burner apparatus and methods of burning fuel gas in the presence of air and furnace flue gas to create a stable flame while suppressing the formation of nitrous oxides ("$NO_x$") and carbon monoxide ("CO").

Various types of gas burners have been developed and successfully utilized with a combination of both diffusion and pre-mix capabilities. A pre-mix approach mixes both the air and fuel gas to a homogenous mixture prior to combustion within the confines of the furnace. A diffusion approach injects the fuel gas into an air stream wherein mixing takes place without a venturi. The flame is stabilized close to the point of exit, creating both thermal and prompt nitrous oxides. Both approaches are routinely utilized to ignite and combust a given fuel gas to generate heat within a process burner.

In both pre-mix and diffusion-type burners, an optimum approach can be defined to reduce both thermal and prompt nitrous oxide formation. The emission of nitrous oxide and carbon monoxide gases by process burners as well as other combustion equipment is closely regulated by the government. The government is constantly pushing for better methodology to further reduce emissions from current combustion equipment.

In order to lower the production of nitrous oxides and other potentially polluting gases, various improved gas burner apparatus are being developed. In one approach, all of the air together with primary fuel is burned in a first zone and the remaining fuel is burned in a second zone. In this staged fuel gas approach, the staged fuel becomes dilute with furnace flue gas diluting a substantial portion of the gas stream during combustion thereby lowering the combustion temperature of the gases. The nitrogen in the air and flue gas functions as a heat sink in that it absorbs heat from the flame. The flue gas can come from the furnace stack (external flue gas) or from the furnace itself (internal flue gas). Lowering the combustion temperature of the gases lowers the formation of nitrous oxides in the produced flue gases. Examples of low $NO_x$ burners and associated methods are shown by U.S. Pat. No. 5,275,552 (issued to John Zink Company on Jan. 4, 1994) and U.S. Pat. No. 6,729,874 B2 (issued to John Zink Company on May 4, 2004), which are incorporated by reference herein.

Staged combustion and dilution of the fuel gas create additional concerns that need to be addressed, including non-combustibility and flame instability. An appreciable amount of air or flue gas is needed to dilute the flame enough to achieve a sufficient reduction in nitrous oxide formation. However, if the fuel gas is overly diluted, it may be difficult to ignite or the ignited flame may become unstable. Flame instabilities can create further instabilities capable of destabilizing the entire furnace.

Coanda surfaces have been utilized in flares wherein significant flow rates at elevated pressures are a reality. A Coanda surface is merely a curved surface designed for the adherence of a fluid. Fluid streams injected on or adjacent to a Coanda surface tend to adhere to and follow the path of the surface. The negative pressure and viscous forces pull the fluid against the surface. The fluid stream is spread into a relatively thin film or sheet, which allows proximate fluids to be mixed in with the fluid stream in a very efficient manner. The additional surface area imparted to the gas significantly enhances mixing. In a flare, for example, which may emit tens of thousands of pounds of waste gas per hour, fast mixing is desirable. As a result, Coanda surfaces and the Coanda effect are commonly used in flare apparatus as it eliminates the need for steam, blowers and related equipment.

However, Coanda surfaces have not been incorporated into low $NO_x$ process burner apparatus. Burner components are smaller and entail much lower gas flows than flare components. As a result, Coanda technology has not been actively applied to process burners. Also, many refinery operators have not changed the refinery furnaces due to the expense involved therewith. As a result, replacement burner assemblies often have to fit into existing furnace boxes which defines the performance criteria the burner must meet (for example, the length and diameter of the flame).

By the present invention, various ways have been discovered to utilize Coanda surfaces in low $NO_x$ staged fuel gas burners to greatly improve the efficiency of the burners while avoiding problems such as non-combustibility and flame instability.

SUMMARY OF THE INVENTION

In accordance with the present invention, gas burner apparatus and methods are provided which meet the needs described above and overcome the deficiencies of the prior art. It has been discovered that a Coanda surface can be coupled with a free fluid stream to mix fuel gas with air and a diluent (furnace flue gas in this case) while maintaining extended turndown capabilities and enhanced stability. The Coanda surface greatly enhances mixing of the flue gas with the other fluids in the stream. Further, by the use of various Coanda surfaces, the amount of flue gas that can be incorporated into a mixing zone and flame can be greatly increased. Thus, the ability to reduce nitrous oxide and carbon monoxide emissions from the burner can be greatly increased while improving flame quality and heat flux distribution in the furnace. The Coanda surfaces and the way the surfaces are positioned on the inside and outside of the burner tile allow the flue gas to be imparted to various mixing and combustion zones associated with the burner without diluting the fuel gas on the inner boundary layer to a point that it becomes non-combustible or results in an instable flame. The Coanda surfaces also allow the shape of the flame to be accurately controlled without the need for other structures such as flame-holders, cones, wings, impingement plates and so forth. These and other advantages of the invention are described in detail below.

In accordance with one aspect of the invention, a gas burner apparatus is provided for discharging a mixture of fuel gas and air into a furnace wherein the mixture is burned in the presence of flue gas while producing a low content of nitrous oxides and carbon monoxide. The gas burner apparatus comprises a plenum, a burner tile, primary fuel gas injection means, and secondary fuel gas injection means. A pre-mix primary means of injection can also be included in the apparatus.

The plenum includes a housing for attachment to the furnace. The housing includes an upper end attached to the furnace, the upper end having an air outlet disposed therein, a lower end opposing the upper end, and a sidewall connecting the upper end and the lower end together. At least one of the sidewall and the lower end has an air inlet disposed therein.

The burner tile has a central opening therein for receiving air from the air outlet of the housing. The burner tile includes a bottom end attached to the upper end of the housing over the air outlet, a top end opposing the bottom end, the top end including a discharge outlet, and a wall connecting the bottom end to the top end and surrounding the central opening. The wall extends into the furnace and has an interior surface, an exterior surface and at least one gas circulation port extending through the wall, the interior surface of the wall including an internal Coanda surface which bulges into the central opening. The internal Coanda surface is positioned on the interior surface of the wall adjacent to (preferably over) the gas circulation port.

The primary fuel gas injection means is connected to a source of fuel gas and operably associated with the burner apparatus for injecting primary fuel gas into the central opening of the burner tile. The primary fuel gas injection means includes an outer gas riser connected to the source of fuel gas, the outer gas riser having an outer primary fuel gas discharge nozzle connected thereto and positioned outside of the wall of the burner tile to inject primary fuel gas through the gas circulation port into the central opening of the tile. The primary fuel gas injection means can also include various other components.

In one embodiment, the primary fuel gas injection means includes a pre-mix unit. The pre-mix unit combines a pre-mix membrane and a venturi mixer. The pre-mix membrane extends around the interior surface of the wall of the burner tile below the gas circulation port therein and has a plurality of pre-mix gas discharge orifices ("ports") in the top thereof. The venturi mixer includes an inner gas riser connected to the source of fuel gas and having an inner primary fuel gas discharge nozzle connected thereto, and a venturi housing operably associated with the inner gas riser and primary fuel gas discharge nozzle. The venturi housing is connected to the pre-mix membrane for feeding a mixture of primary fuel gas and air into the pre-mix membrane. The pre-mix unit is capable of delivering a range of lean mixtures of primary fuel gas and air into the central opening of the burner tile.

The secondary fuel gas injection means is connected to a source of fuel gas and operably associated with the burner apparatus for injecting secondary stage fuel gas from outside the burner tile to a point adjacent to the discharge outlet of the burner tile (preferably on or adjacent to the exterior surface of the burner tile). The secondary fuel gas injection means includes an outer gas riser connected to the source of fuel gas and having a secondary fuel gas discharge nozzle connected thereto for injecting secondary fuel gas on or adjacent to the exterior surface of the wall of the burner tile. In one configuration, the primary fuel gas injection means and secondary fuel gas injection means utilize the same outer gas riser and fuel gas discharge nozzle. The fuel gas discharge nozzle serves as both the primary fuel gas discharge nozzle and the secondary fuel gas discharge nozzle. The nozzle includes one or more ports for injecting fuel gas through the gas circulation port extending through the wall of the burner tile and one or more ports for injecting fuel gas on or adjacent to the exterior surface of the wall of the burner tile.

The exterior surface of the wall of the burner tile preferably also includes an external Coanda surface which bulges outwardly from the exterior surface. The outer gas riser and secondary fuel gas discharge nozzle injects secondary stage fuel gas on or adjacent to the external Coanda surface. The external Coanda surface preferably extends completely around the exterior surface of the wall of the burner tile; however, it can also intermittently extend around the exterior surface of the wall of the burner tile. The intermittent external Coanda surfaces are preferably spaced by external planar surfaces which can be vertical or inclined inwardly toward the central opening of the tile.

In another embodiment, the gas burner includes a plenum, a burner tile, primary fuel gas injection means and secondary fuel gas injection means. The plenum includes a housing for attachment to the furnace. The housing includes an upper end attached to the furnace, the upper end having an air outlet disposed therein, a lower end opposing the upper end, and a sidewall connecting the upper end and the lower end together. At least one of the sidewall and the lower end has an air inlet disposed therein.

The burner tile has a central opening therein for receiving air from the air outlet of the housing. The burner tile includes a bottom attached to the upper end of the housing over the air outlet, a top end opposing the bottom end, the top end including a discharge outlet, and a wall connecting the bottom end to the top end and surrounding the central opening. The wall extends into the furnace space and has an interior surface and an exterior surface, the exterior surface of the wall including an external Coanda surface which bulges outwardly from the exterior surface.

The primary fuel gas injection means is connected to a source of fuel gas and operably associated with the burner apparatus for injecting primary fuel gas into the central opening of the burner tile. The secondary fuel gas injection means is also connected to a source of fuel gas and operably associated with the burner apparatus for injecting secondary stage fuel gas from outside of the burner tile to a point adjacent to the discharge outlet of the burner tile. The secondary fuel gas injection means includes an outer gas riser connected to the source of fuel gas and having a secondary fuel gas discharge nozzle connected thereto for injecting secondary stage fuel gas on or adjacent to the external Coanda surface.

In another aspect, the present invention includes burner tiles for use in association with a burner plenum to form a gas burner apparatus for discharging a mixture of fuel gas and air into a furnace wherein the mixture is burned in the presence of flue gas while producing a low content of nitrous oxides and carbon monoxide. The inventive burner tiles are the burner tiles described above in association with the inventive gas burner apparatus. The inventive burner tiles can be used in retrofit applications.

In another aspect, the invention includes a gas tip for use in association with a gas burner apparatus. The gas tip comprises a gas barrel for connection to a source of fuel gas, a gas deflector attached to the gas barrel, and a fuel gas outlet disposed between the gas barrel and the gas deflector. The gas deflector has an exterior surface that includes a Coanda surface positioned with respect to the fuel gas outlet such that fuel gas discharged from the fuel gas outlet follows the path of the Coanda surface. The gas deflector preferably has a tulip shape. The inventive gas tip can be used, for example, as the secondary stage fuel gas discharge nozzle of the inventive gas burner apparatus, as the tip of a pilot for the inventive gas burner apparatus or as a primary inner fuel gas discharge nozzle attached to a central inner gas riser (for example, a central gas gun). The inventive gas tip can also be used in connection with a series of gas nozzles serving as primary gas tips around the inner perimeter of the tile.

In another aspect, the invention provides a method of burning a mixture of air and fuel gas in the presence of flue gas in a furnace to generate heat in the furnace wherein a gas burner apparatus having a mixing zone for mixing the air, fuel gas and flue gas prior to combustion thereof is utilized. The method comprises the following steps:

(a) providing a Coanda surface in the mixing zone;
(b) injecting fuel gas on or adjacent to the Coanda surface in a manner that entrains flue gas from outside the mixing zone into the mixing zone and causes the flue gas to mix with the air and fuel gas in the mixing zone;

(c) discharging the mixture of combustion air, fuel gas and flue gas from the mixing zone into the furnace; and (d) burning the mixture of combustion air, fuel gas and flue gas discharged from said mixing zone in the furnace.

In one embodiment, the mixing zone is surrounded by a wall and the mixture of air, fuel gas and flue gas is discharged from the mixing zone into a primary reaction zone in the furnace. In this embodiment, the method further comprises the steps of:

(e) providing an external Coanda surface on the exterior surface of the wall; and (f) injecting a stream of secondary stage fuel gas on or adjacent to the external Coanda surface in a manner that entrains flue gas into the stream to create a secondary fuel gas/flue gas mixture and causes the secondary fuel gas/flue gas mixture to burn in a secondary reaction zone in the furnace.

In another embodiment, the inventive method comprises the steps of:

(a) providing a Coanda surface on the exterior surface of the wall of the burner apparatus;

(b) injecting primary fuel gas into the mixing zone in a manner that causes the fuel gas to mix with air in the mixing zone;

(c) discharging the mixture of air and fuel gas from the mixing zone; and (d) burning the mixture of air and fuel gas discharged from the mixing zone in a primary reaction zone in the furnace;

(e) injecting a stream of secondary stage fuel gas on or adjacent to the external Coanda surface in a manner that entrains flue gas into the stream to create a secondary fuel gas/flue gas mixture and causes the secondary fuel gas/flue gas mixture to burn in a secondary reaction zone in the furnace.

The interior surface of the wall of the burner apparatus preferably also includes an internal Coanda surface. The fuel gas injected into the mixing zone is injected on or adjacent to the internal Coanda surface in a manner that entrains flue gas from outside the mixing zone into the mixing zone and causes the flue gas to mix with the air and fuel gas in the mixing zone.

The objects, features and advantages of the present invention will be readily apparent to those skilled in the art upon a reading of the description of preferred embodiments which follows when taken in conjunction with the accompanying drawings.

BRIEF DESCRIPTION OF THE DRAWINGS

FIG. 3A is a section view similar to FIG. 3 and further illustrating a gas circulation choke that can be incorporated into the inventive burner tile.

FIG. 4 is an enlarged detail view of a portion of the burner tile illustrated by FIG. 3 illustrating the flow of gas in association with the burner tile.

FIG. 4A is an enlarged detail view of a portion of the burner tile of FIG. 3A illustrating the flow of gas in association with the burner tile.

FIG. 4B is an enlarged detail view of another portion of the burner tile shown by FIG. 4.

FIG. 5 is a sectional view taken along the line 5-5 of FIG. 2.

FIG. 8 is a section view similar to FIG. 1 but illustrating the use of a central venturi mixer in lieu of the gas gun shown by FIG. 1.

FIG. 9 is a section view similar to FIGS. 1 and 8 but illustrating the use of a plurality of internal gas risers in lieu of the pre-mix unit. FIG. 9 also illustrates the use of a conventional pilot in association with the inventive gas burner apparatus.

FIG. 10 is a section view of the burner tile illustrated by FIG. 3 but illustrating a different outer gas riser configuration.

FIG. 11 is a section view illustrating an alternative embodiment of the inventive burner tile.

FIG. 11A is a section view taken along the line 11A-11A of FIG. 12 and illustrating one variation of the planar wall sections (inclined) of the burner tile of FIG. 11.

FIG. 11B is a section view taken along the line 11B-11B of FIG. 12 and illustrating another variation of the planar wall sections (straight/vertical) of the burner tile of FIG. 11.

FIG. 12 is a section view taken along the line 12-12 of FIG. 11.

FIG. 16 is a section view illustrating yet another embodiment of the inventive burner tile.

FIG. 17 is an enlarged detail view of a portion of the burner tile of FIG. 16.

FIG. 18 is a section view taken along the line 18-18 of FIG. 16.

FIG. 19 is a section view taken along the line 19-19 of FIG. 16.

FIG. 21 is a section view taken along the line 21-21 of FIG. 20.

FIG. 22 is a partial section view illustrating the inventive gas tip as configured for use as a pilot.

FIG. 23 is an enlarged detail view of a portion of the gas tip illustrated by FIG. 22.

DESCRIPTION OF THE PREFERRED EMBODIMENTS

Figure 1:
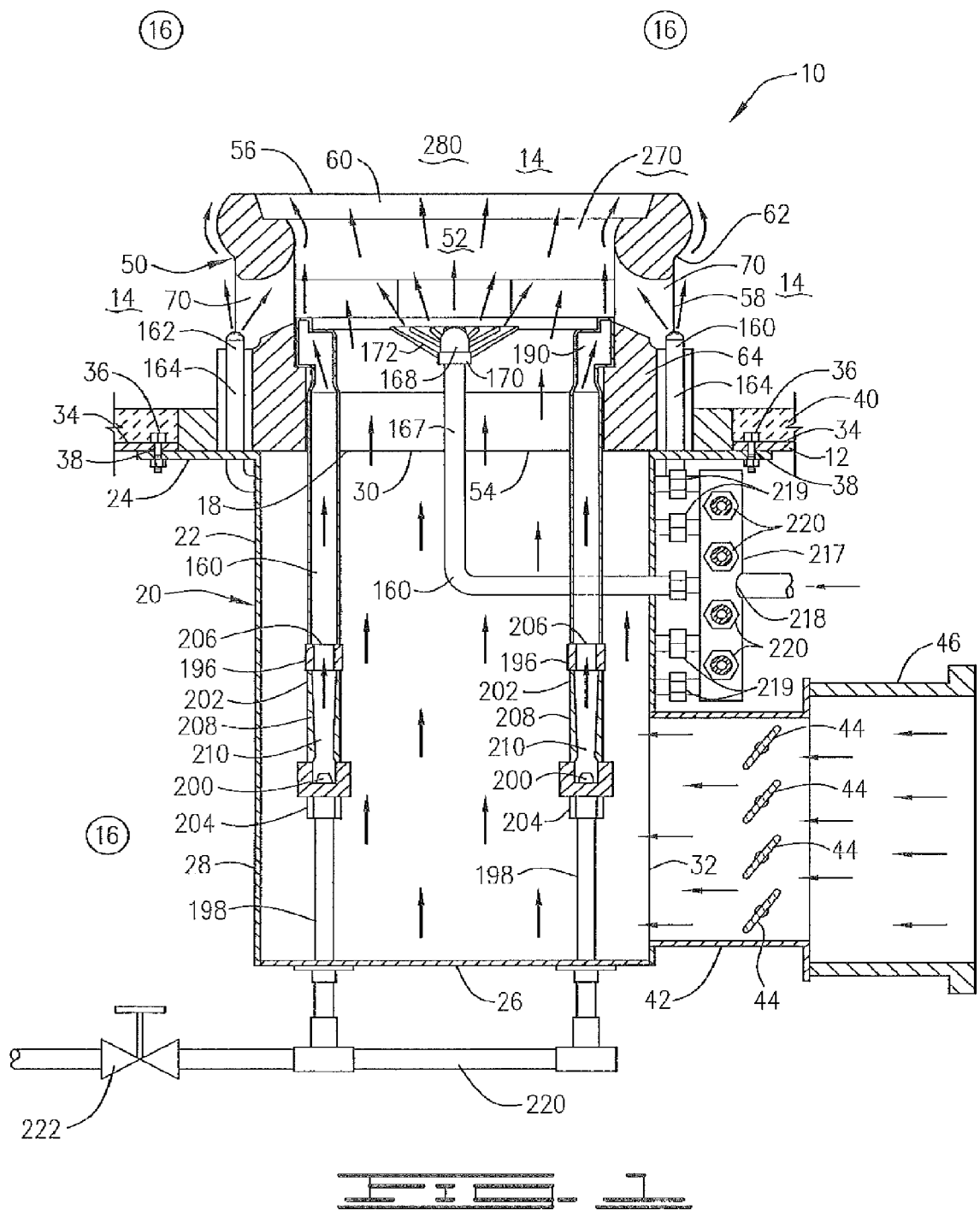
FIG. 1 is a section view of the gas burner apparatus of the present invention attached to a furnace floor.
Figure 2:
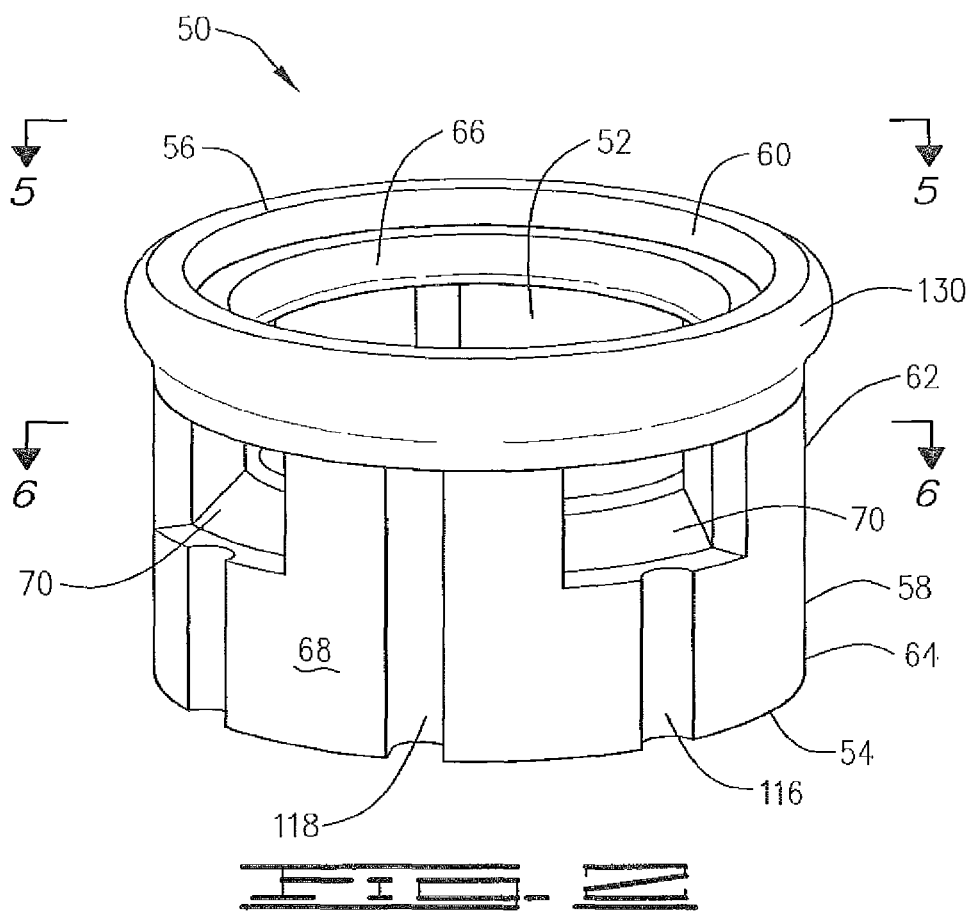
FIG. 2 is a perspective view of the burner tile of the gas burner apparatus of the present invention.

Referring now to the drawings, and particularly to FIG. 1, the gas burner apparatus of the present invention is illustrated and generally designated by the numeral 10. As shown by FIG. 1, the burner apparatus 10 is sealingly attached to a furnace wall 12 (preferably the bottom wall or floor) of a furnace space 14 of a furnace 16 (the overall furnace is not shown) over an opening 18 in the wall. Although gas burner apparatus are commonly mounted vertically and fired upwardly as shown in FIG. 1, it is to be understood that the gas burner apparatus 10 can also be mounted in other ways. For example, the gas burner apparatus 10 can be mounted horizontally and fired horizontally or vertically, or can be mounted vertically and fired downwardly (down-fired). Preferably, the gas burner apparatus 10 is vertically mounted to the floor of the furnace space 14 and up-fired as shown in the drawings.

The gas burner apparatus 10 discharges a mixture of fuel gas and air into the furnace space 14 of the furnace 16 wherein the mixture is burned in the presence of flue gas while producing a low content of nitrous oxides and carbon monoxide. The gas burner apparatus 10 comprises a plenum 20 including a housing 22 for attachment to the furnace. The housing includes an upper end 24, a lower end 26 opposing the upper end and a sidewall 28 connecting the upper end and lower end together. The upper end 24 of the housing 22 has an air outlet 30 disposed therein. As shown by FIG. 1, the upper end 24 of the housing 22 is attached to the furnace wall 12 such that the air outlet 30 is positioned underneath the opening 18 in the furnace wall. At least one of the sidewall 28 and the lower end 26 of the housing 22 has an air inlet 32 disposed therein. Preferably, and as shown by FIG. 1, the air inlet 32 is disposed in the sidewall 28 of the housing 22.

As illustrated by FIG. 1, the housing 22 is attached to the bottom wall or floor 12 of the furnace 16 by means of a flange 34 and a plurality of bolts 36 which extend through complementary openings 38 in the flange and bottom wall of the furnace. The furnace wall 12 includes an internal layer of insulating material 40 attached thereto. An air flow register or damper 42 for regulating the rate of flow of air through the air inlet 32 is attached to the air inlet. The damper 42 includes a plurality of adjustable fins 44 which can be rotated from vertical to horizontal to open and close the damper. A muffler 46 for reducing both jet and combustion noise is also attached to the air inlet 32. As understood by those skilled in the art, the gas burner apparatus 10 can be a natural draft burner (i.e., the air required for combustion is naturally drafted into the housing 22), a forced draft burner (for example, a blower is used to blow the combustion air into the housing), a balanced draft burner (for example, blowers are used to both blow air in and blow air out of the burner to achieve an appropriate balance of combustion air) or variations thereof. A variety of different types of fuel gas can be burned by the burner apparatus 10, including natural gas, hydrogen, propane, ethane or other typical refinery-type fuels.

The gas burner apparatus 10 further comprises a burner tile 50 having a central opening 52 therein for receiving air from the air outlet 30 of the housing 22. The burner tile 50 includes a bottom end 54, a top end 56 opposing the bottom end and a wall 58 connecting the bottom end to the top end and surrounding the central opening 52. The bottom end 54 of the burner tile 50 is attached to the upper end 24 of the housing 22 over the air outlet 30 of the housing. The top end 56 of the burner tile 50 includes a discharge outlet 60 therein.

Referring now to FIGS. 1-6, the wall 58 of the burner tile 50 extends into the furnace space 14 and has an upper portion 62, a lower portion 64, an interior surface 66 and an exterior surface 68. The wall 58 further includes a plurality of gas circulation ports 70 extending through the wall. The interior surface 66 of the wall 58 includes a plurality of internal Coanda surfaces 80 positioned adjacent to or over (over as shown) the gas circulation ports 70, each internal Coanda surface bulging into the central opening 52 of the burner tile 50. Each internal Coanda surface 80 and gas circulation port 70 are positioned in a recessed section 82 in the interior surface 66 of the wall 58. Each recessed section 82 includes opposing sidewalls 84 and 86 that extend from the interior surface 80 of the wall 58 into the central opening 52. As best shown by FIG. 4B, the sidewalls 84 and 86 extend further into the central opening 52 than the internal Coanda surface 80 that is positioned in the corresponding recessed section 82 extends into the central opening. Put another way, the internal Coanda surfaces 80 are inset into the interior surface 66 of the wall 58. The internal Coanda surfaces 80 are preferably inset in the interior surface 66 of the wall 58 by a distance in the range of from about 0.25 inches to about 0.75 inches. As described further below, the space between the internal Coanda surfaces 80 and the interior surface 66 of the remaining portion of the wall 58 prevents fuel gas and/or flue gas from being swept off of the internal Coanda surfaces by the flow of fuel gas and/or air through the central opening 52 of the burner tile 50.

In order to achieve a significant Coanda effect, the surfaces of the internal Coanda surfaces 80 should be substantially smooth and have a substantially true radius or uniform arc. Also, it is important for each internal Coanda surface to have enough curvature to sufficiently attract the gas stream at issue. If the Coanda surface does not have enough curvature or surface area, the surface may not have a sufficient area to initiate the Coanda effect due to the momentum of the gas (i.e., the gas stream may not be drawn to the surface). In order to assure a sufficient Coanda effect, the ratio of the diameter of the fuel discharge port that injects fuel gas into and through the gas circulation port 70 on or adjacent to the subject internal Coanda surface 80 (or average port diameter if multiple fuel discharge ports are used (the "primary port diameter") to the radius of the internal Coanda surface (the "internal Coanda radius") needs to be at least 7:1. For example, the diameter of the port (or average diameter if multiple ports are involved) of the primary fuel gas discharge nozzle 166 to the internal Coanda radius needs to be at least 7:1. Preferably the primary port diameter to internal Coanda radius ratio is at least 10:1, most preferably at least 12:1. So, for example, with a primary port diameter of 0.0625 inches and a 0.75 inch internal Coanda radius, the primary port diameter to internal Coanda ratio is 12:1.

Assuming that the Coanda surface has enough curvature or surface area, the gas stream or jet is aligned to be tangent with the curvature of the Coanda surface to initiate a proper Coanda effect, even when dealing with small gas ports. This can vary significantly with large Coanda surfaces used in flares, for example, where higher mass flows in conjunction with a slotted injection scenario are utilized.

Apart from the above parameters, the particular size and shape of the internal Coanda surfaces 80 can vary depending on the size and shape of the gas circulation ports, the size and shape of the burner tile and other factors relating to the particular application. The orientation of the internal Coanda surfaces 80 (e.g., vertical, horizontal, etc.) on the interior surface 66 can also vary depending on the above factors.

The internal Coanda surfaces 80 are a very important component of the inventive gas burner 10. They allow a great deal of flue gas to be entrained without overly diluting the fuel gas and preventing combustion or causing flame instability. This is at least partly due to the inner boundary layer remaining fuel rich. The stream of primary fuel gas and air injected through the gas circulation ports 70 is pulled and maintained against the Coanda surfaces 80. The fuel gas stream is broken apart and expanded into a film containing a much broader surface area. The center of the core of gas is exposed. As a result, the distance and time needed to mix the flue gas with the fuel gas (and any other fluids involved in the particular application, for example air and/or steam) is substantially lessened. Significantly more flue gas and air (and other fluids if desired) can be mixed with the fuel gas jet. As a result, a more stable flame is created, the content of nitrous oxides in the flue gas generated by the burner is reduced and the flame can be more easily shaped.

As shown by FIGS. 3A and 4A, in one configuration the burner tile 50 further includes circulation choke means 87 positioned in the gas circulation ports 70 for inhibiting the flow of air from within the central opening 52 of the burner tile 50 through the gas circulation ports to outside of the tile. The circulation choke means 87 includes a shield 88 for each gas circulation port 70. The shields 88 are attached to the wall 58 of the burner tile 50 and extend upwardly into the corresponding gas circulation port 70. As shown, the shields 88 can be an integral part of the refractory burner tile. The circulation choke means 87 is used in applications in which it is necessary to abate the flow of fluids from inside the tile through the gas circulation ports 70 to outside the tile. Outbound fluid flow can occur, for example, when a diffusion jet stream is not injected through the circulation gas ports 70. Elimination of the outflow of air through the ports 70 aids in reducing emissions and adds flame shaping capabilities to the design (when diffusion jets are not injected through the ports 70 to maintain a fluid seal between the two fluid flow regimens). The circulation choke means 87 prevent the air from short circuiting the tile and thereby raising nitrous oxide emissions, and keep the flame off the exterior surface of the wall of the burner tile. The circulation choke means 87 also stop any premature interaction between the pre-mixed gas and the diffusion gas in the central opening 52. In some cases, without the shield 88 in place, the momentum of the diffusion primary will pull the pre-mix flame into the circulation port 70 where it then carries air prematurely to the base of the diffusion jet.

The entire burner tile 50 including the shield 88 (when the shield is utilized) is made of a heat and flame resistant refractory material, that is, a material that has the ability to retain its physical shape and chemical identity even when subject to high temperatures. Examples of refractory materials that can be used include silicon carbide, alumina mixtures and ceramic fiber materials.

Referring now specifically to FIGS. 4, 4A and 4B, the gas circulation ports 70 are illustrated in detail. Each gas circulation port 70 includes a ledge 90, a top surface 92 (which is a portion of the internal Coanda surface 80) and a pair of opposing sidewalls 94 and 96 interconnecting the ledge and top surface together. When the burner tile does not include the circulation choke means 87, as shown by FIG. 4, the ledges 90 are either flat, that is, substantially co-planar with the top surfaces 92 of the ports 70, or inclined downwardly from the interior surface 66 toward the exterior surface 68 of the wall 58. Preferably, the ledges 90 are inclined downwardly from the interior surface 66 toward the exterior surface 68 of the wall 58 at an angle in the range of from 15° to −60°. For example, when the outer gas risers (discussed below) do not substantially extend through the wall 12 of the furnace, the ledges 90 are inclined downwardly at a greater angle. In configurations in which the outer gas risers substantially extend above the bottom wall 12 of the furnace, the ledges 90 are inclined downwardly at an angle, for example, in the range of about 10° to about 60°. Preferably, the ledges 90 are inclined downwardly from the interior surface 66 toward the exterior surface 68 of the wall 58 at an angle in the range of from 15° to 25°. When the burner tile 50 includes the circulation choke means 87, as shown by FIG. 4A, the ledges 90 incline downwardly from the interior surface 66 toward the exterior surface 68 of the wall 58 at a fairly severe angle due to the presence of the shield 88 in the gas circulation port 70. The downward incline of the ledges functions to prevent air inside the central opening 52 from radially exiting the central opening 52 through the ports 70. Whether or not the circulation choke means 87 is used and the angle at which the ledge 90 inclines will depend on the particular application.

The interior surface 66 of the upper portion 62 of the wall 58 further includes a primary bluff body 100 which has a flat surface 102 facing upwardly, that is facing the discharge outlet 60 of the burner tile. The primary bluff body 100 extends completely around the interior surface 66 of the wall 58. Each of the internal Coanda surfaces 80 includes a lower end 104, an upper end 106 and a bulge portion 108 connecting the lower end and upper end together. The lower ends 104 of the internal Coanda surfaces 80 extend over the top of the gas circulation ports 70. The upper ends 106 of the internal Coanda surfaces 80 terminate at the flat surface 102 of the primary bluff body 100. The top end 56 of the burner tile 50 includes a secondary bluff body 110 which has a flat surface 112 facing upwardly, that is facing the furnace space 14. The secondary bluff body 110 extends completely around the interior surface 66 of the wall 58. The primary bluff body 100 creates a low pressure zone and provides a mixing zone in the upper portion of the central opening 52. The secondary bluff body 110 functions to stabilize the gas at the discharge outlet 60 of the tile 50. Staged fuel has the ability to enrich the stabilized fuel on the top end 56 of the tile 50 in the event it becomes too lean or diffuse.

The exterior surface 68 of the wall 58 of the burner tile 50 includes a plurality of port sections 116 (which include a gas circulation port 70) and a plurality of non-port sections 118 (which do not include a gas circulation port 70). The upper portion 62 of exterior surface 68 of the wall 58 of the burner tile 50 also includes an external Coanda surface 130 which bulges outwardly from the exterior surface 68.

In one embodiment, as shown by FIGS. 1-10, the external Coanda surface 130 extends completely around the exterior surface 68 of the wall 58. This scenario allows all of the staged fuel to be shaped by a Coanda surface.

In another embodiment, as shown by FIGS. 11-12, the upper portion 62 of exterior surface 68 of the wall 58 of the burner tile 50 includes a plurality of external Coanda surfaces 130, each bulging outwardly from the exterior surface 68. In the embodiment shown by FIGS. 11-12, the external Coanda surfaces 130 are spaced apart by external planar surfaces 132. As shown by FIGS. 11A and 11B, the external planar surfaces 132 can be either inclined toward the central opening 52 of the burner tile (FIG. 11A) or straight or vertical (substantially parallel to the longitudinal axis of the burner tile) (11B). If inclined, the external planar surfaces 132 slope inwardly at an angle in the range of from 5° to 25°. The use of alternating external Coanda surfaces and planar (flat) surfaces (inclined or straight) provide for more control with respect to the shape of the flame. The staged fuel can be more aggressively shaped to maintain a narrow flame. This is especially important where effects of the wall 58 need to be overcome. A portion of the fuel gas can be injected at aggressive angles to further enhance flame shaping, or allow for a more aggressive biasing of the staged fuel.

Figure 13:
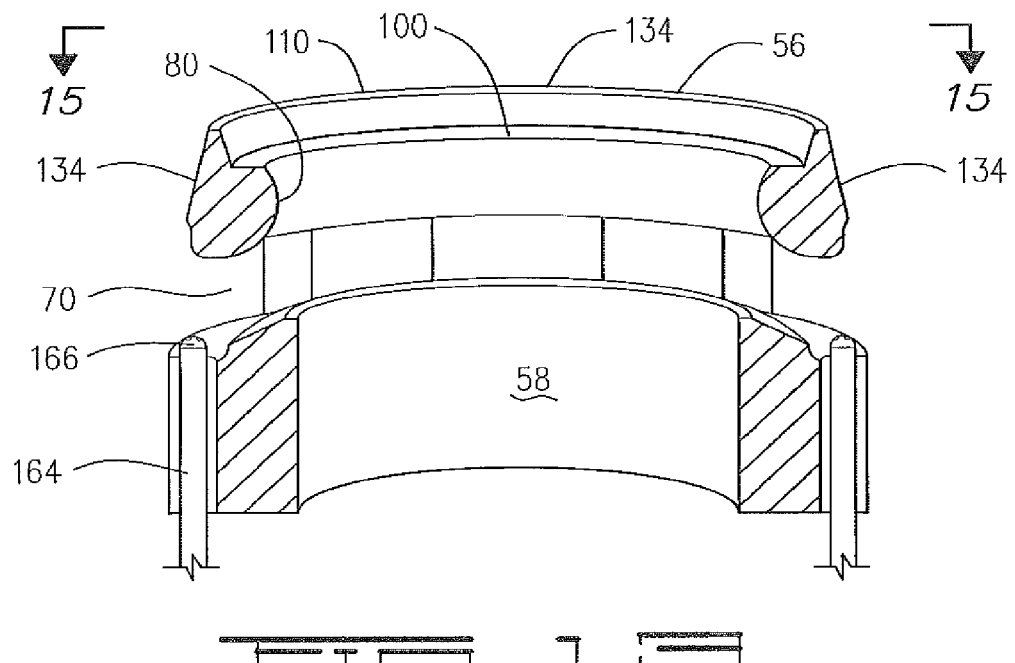
FIG. 13 is a section view illustrating yet another embodiment of the inventive burner tile.
Figure 14:
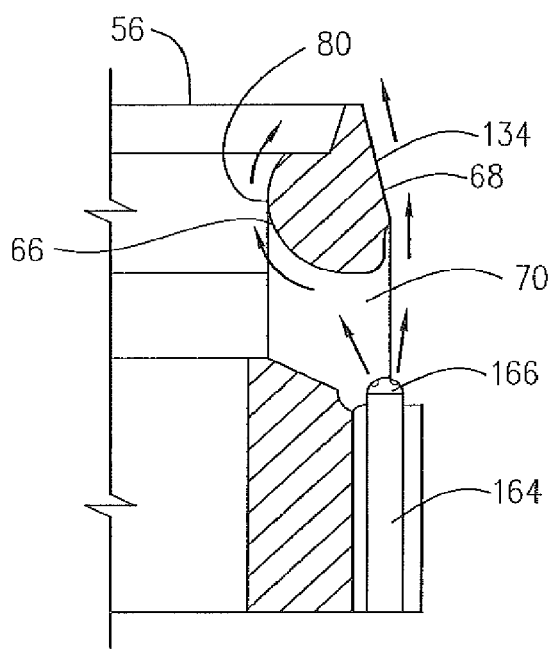
FIG. 14 is an enlarged detail view of a portion of the burner tile shown by FIG. 13.
Figure 15:
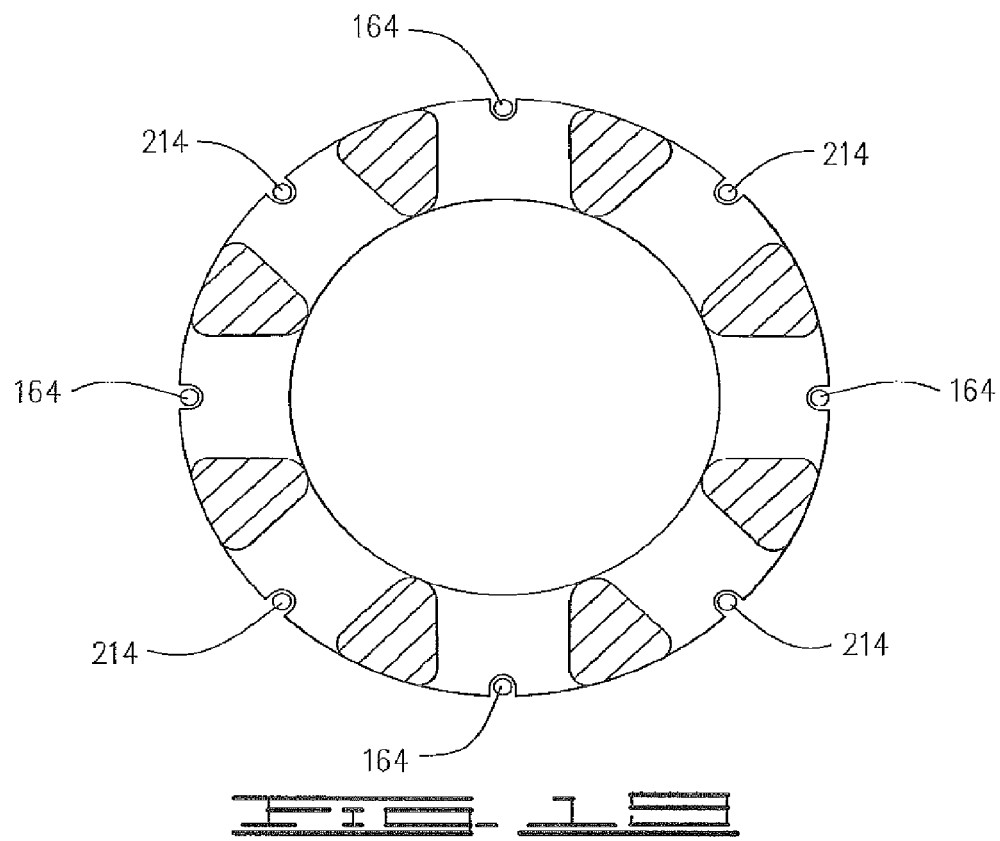
FIG. 15 a section view taken along the line 15-15 of FIG. 13.

In yet another embodiment, as shown by FIGS. 13-15, the upper portion 62 of exterior surface 68 of the wall 58 of the burner tile 50 includes an external planar surface 134 that extends completely around the exterior surface 68 of the wall 58. The external planar surface 134 slopes inwardly at an angle in the range of from 5° to 25°. It can also be substantially straight or vertical (not inclined inwardly). This embodiment allows the staged drillings to be much more aggressive to allow significant capabilities to be realized within the shaping of the flame.

Thus, the various configurations of the upper portion 62 of the exterior surface 68 of the burner tile 50 allow the size and shape of the flame to be accurately controlled depending on the application. Additional advantages are achieved as well.

In order to achieve a significant Coanda effect, the surfaces of the external Coanda surfaces 130 should be substantially smooth and have a substantially true radius or uniform arc. Also, it is important for each external Coanda surface to have enough curvature to sufficiently attract the gas stream at issue. If the Coanda surface does not have enough curvature or surface area, the surface may not have a sufficient area to initiate the Coanda effect due to the momentum of the gas (i.e., the gas stream may not be drawn to the surface). In order to assure a sufficient Coanda effect, the ratio of the diameter of the fuel discharge port that injects fuel gas on or adjacent to the subject external Coanda surface 130 (or average port diameter if multiple fuel discharge ports are used) (the "secondary port diameter") to the radius of the external Coanda surface (the "external Coanda radius") needs to be at least 7:1. For example, the diameter of the port (or average diameter if multiple ports are involved) of the secondary fuel gas discharge nozzle 166 to the external Coanda radius needs to be at least 7:1. Preferably the secondary port diameter to external Coanda radius ratio is at least 10:1, most preferably at least 12:1.

Apart from the above parameters, the particular size and shape of the external Coanda surfaces 130 can vary depending on the size and shape of the burner tile and other factors relating to the particular application. The orientation of the external Coanda surfaces 130 (e.g., vertical, horizontal, etc.) on the exterior surface 68 can also vary depending on the above factors.

The external Coanda surface(s) 130 are also a very important component of the inventive gas burner apparatus 10. The surface(s) 130 function to entrain more flue gas into the staged fuel gas stream and greatly enhance the mixing process. When combined with the more conventional external planar surfaces 132 or surface 134, the external Coanda surface(s) allow a great deal of precision and flexibility in achieving the type and degree of staged combustion needed for the particular application. The external Coanda surface(s) 132 enhances the diluting of the fuel gas jet while maintaining a stable flame. If desired, the external Coanda surface(s) 132 can be used in connection with the inventive burner tile 50 when the tile does not have gas circulation ports 70 therein.

In yet another embodiment, as shown by FIGS. 16-19, the burner tile 50 further comprises a lip 140 transversely extending from the interior surface 66 of the wall 58 into the central opening 52 of the burner tile. The lip 140 is attached to the wall 58 adjacent to the top end 56 of the burner tile 50 and extends around the interior surface 66 of the wall. The lip 140 includes a lower end 142, a top end 144 and a body 146 connecting the lower end and top end together. The body 146 includes a plurality of protrusions 150 extending into said central opening 52 of the burner tile. The protrusions 150 include various cross-sectional shapes (for example, elliptical, square, and triangular) and are separated by grooves 152. As best shown by FIG. 19, the lower end 142 is curved which facilitates the flow of fluids under the lip 140. The overall lip 140 functions to turn the fluid flow 90°. The fluid becomes very dilute with air; the flame speed becomes low. The protrusions 150 and grooves 152 cause the gas to stabilize and help maintain the flame in the event stabilization is needed due to over-dilution of fuel. The radial projections serve as a bluff body to catch the lean mixture and stabilize it on the tip of the tile surface. This geometry can also function with the central gas gun 170 or central venturi mixer 176 to provide an enhanced quench mechanism to the flame.

Depending on the application, the gas burner apparatus 10 can include both the internal Coanda surfaces 80 and external Coanda surface(s) 130. Preferably, the gas burner apparatus 10 includes both the internal Coanda surfaces 80 and external Coanda surface(s) 130.

The gas burner apparatus 10 further comprises primary fuel gas injection means 160 and secondary fuel gas injection means 162. The primary fuel gas injection means 160 are connected to a source of fuel gas (not shown) and operably associated with the burner apparatus 10 for injecting primary fuel gas into the central opening 52 of the burner tile 50. The secondary fuel gas injection means 162 are connected to a source of fuel gas (not shown) and operably associated with the burner apparatus 10 for injecting secondary stage fuel gas from outside of the central opening 52 and burner tile 50 to a point adjacent to the discharge outlet 60 of the burner tile. As used herein and in the appended claims, primary fuel gas merely means fuel gas injected into the central opening 52 of the burner tile (that is, any gas injected into the combustion zone formed by the confines of the burner tile 50). Secondary stage fuel gas merely means the fuel gas injected on the outside or over the wall 58 of the burner tile 50.

The primary fuel gas injection means can include a variety of components which can be used separately or together depending on the particular application.

As a first component, the primary fuel gas injection means 160 includes a plurality of outer gas risers 164 connected to a source of fuel gas. Each outer gas riser 164 has an outer primary (diffusion) fuel gas discharge nozzle 166 (including one or more gas ports therein) connected thereto which is positioned outside of said wall 58 of said burner tile to inject primary fuel gas through a gas circulation port 70 on or adjacent to the internal Coanda surfaces 80. The primary fuel gas is preferably injected directly on to the internal Coanda surfaces 80. As used herein and in the appended claims, a "nozzle," for example a "fuel gas discharge nozzle," is any kind of gas tip (typically connected to a gas riser) that includes one or more gas discharge openings (for example, ports or slots) therein for discharging or injecting a gas stream or jet from the nozzle. As used herein and in the appended claims, injection of a fluid (fuel gas in this case) "on or adjacent to a surface" means injection of the fluid directly on to the surface or in close enough proximity to the surface for the surface to have an effect (for example, a Coanda effect) thereon. For example, it is sufficient if the fuel gas stream or jet is injected in close enough proximity to the curvature of the Coanda surface for the Coanda effect to be initiated by the pressure of the stream or jet in conjunction with the surface area of the curved surface. In applications in which the temperature associated with the burner apparatus 10 is very high (for example, 2000° F. and above), the outer gas risers 164 do not substantially extend above the wall 12 of the furnace in order to prevent damage thereto. In other applications, both the risers 164 and nozzles 166 extend through and above the wall 12.

As another component, the primary fuel gas injection means 160 can also include one or more inner gas risers 167, each inner gas riser being connected to a source of fuel gas and being positioned inside of the burner housing 22. Each inner gas riser has an inner primary fuel gas discharge nozzle 168 (including one or more gas ports therein) connected thereto for injecting primary stage fuel gas directly into the central opening 52 of the burner tile. The use of a plurality of inner gas risers 167 and inner primary fuel gas discharge nozzles 168 to inject fuel gas directly into the central opening 52 of the burner tile 50 is shown by FIG. 9. As shown, one or more risers 167 and corresponding nozzles 168 can be positioned at each gas circulation port 70 to inject a fraction of the primary fuel gas directly on or adjacent to an internal Coanda surface 80, to help stabilize the flame.

Figure 3:
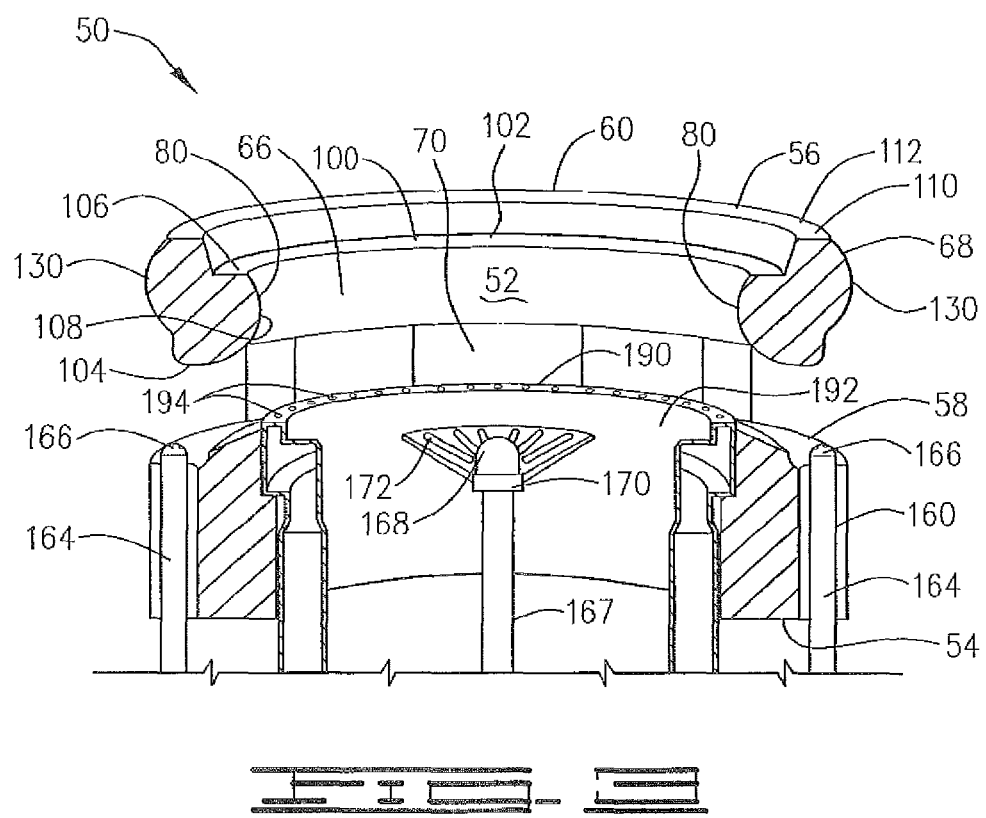
FIG. 3 is a section view of the burner tile of the gas burner apparatus of the present invention.
Figure 6:
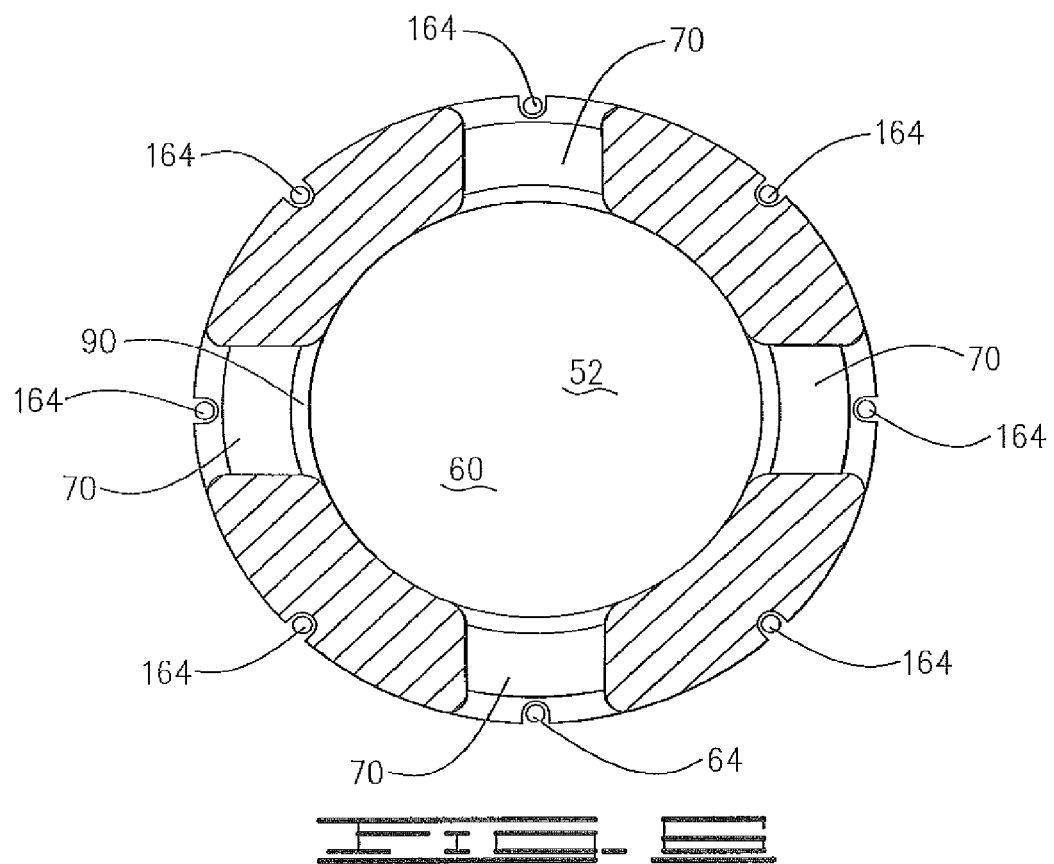
FIG. 6 is a sectional view taken along the line 6-6 of FIG. 2.

As shown by FIGS. 1, 3 and 3A, an inner gas riser 167 and corresponding inner fuel gas discharge nozzle 168 can be used to form a central gas gun 170. An inner gas riser 167 is connected to a source of fuel gas and extends into the center of the central opening 52 of the burner tile 50. An inner fuel gas discharge nozzle 168 in the form of a bull nose tip (including a plurality of gas ports therein) is connected to the inner gas riser 167. A gas dispersion cone 172 is attached to the central riser and extends around the bull nose tip 168 for dispersing the gas discharged by the tip. The central gas gun 170 can be used to inject a free jet of primary fuel gas directly into the burner tile 50. The momentum of the free jet of primary fuel gas together with the momentum of the air pulls flue gas into the central opening 52 of the burner tile 50 which helps reduce harmful emissions.

As shown by FIG. 8, an inner gas riser 167 and corresponding inner fuel gas discharge nozzle 168 can also be used to form a central venturi mixer 176. An inner gas riser 167 is connected to a source of fuel gas and is positioned inside of the burner housing 22. An inner fuel gas discharge nozzle 168 in the form of a gas spud (including one or more gas ports therein) is connected to the inner gas riser 167. A venturi housing 178 is operably associated with the riser 167 and nozzle 168. The venturi housing 178 is attached to the inner gas riser 167 and positioned above the spud 168 for receiving the fuel gas discharged from the spud. The venturi housing 178 includes an inlet 180, an outlet 182 and a venturi body 184 having a narrow portion 186 therein. The venturi body 184 creates a low pressure zone which entrains air into the housing 178. A mixture of fuel gas and air is formed in the housing 178. The central venturi mixer can be used to inject a pre-mix stream of primary fuel gas and air directly into the burner tile 50. It creates a lean or even ultra lean pre-mix zone to reduce flame length and further reduce nitrous oxide emissions. Multiple venturi mixers 176 can be utilized if desired.

Figure 7:
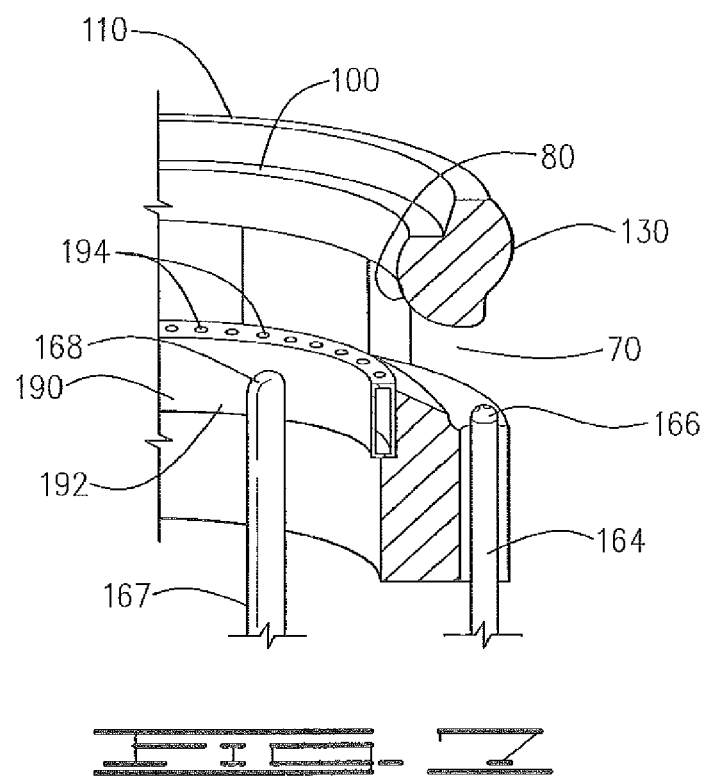
FIG. 7 is another detail view of a portion of the burner tile shown by FIG. 3 illustrating a portion of the pre-mix unit.

As shown by FIGS. 1, 3, 3A, 7 and 8, the primary fuel gas injection means 160 can also include a pre-mix unit 190 which extends into the central opening 52 of the burner tile 50. As best shown by FIG. 7, the pre-mix unit 190 includes a pre-mix membrane 192 extending around and inset somewhat (for optimum stability) in the interior surface 66 of the wall 58 of the burner tile 50 below the gas circulation ports 70 in the wall. A plurality of pre-mix gas ports 194 is disposed in the top of the membrane 192. A pair of venturi mixers 196 feed pre-mix streams of fuel gas and air into the membrane 192. Each venturi mixer 196 includes an inner gas riser 198 connected to a source of fuel gas and having an inner primary fuel gas discharge nozzle 200 in the form of a gas spud (which includes one or more gas ports therein) connected thereto. A venturi housing 202 is operably associated with the riser 198 and nozzle 200. The venturi housing 202 is attached to the riser 198 and positioned to receive fuel gas discharged from the nozzle 200. The venturi housing 202 includes an inlet 204, an outlet 206 and a venturi body 208, preferably having a narrow portion 210 therein. In some applications, the narrow portion 210 is not necessary. The venturi body 208 creates a low pressure zone which entrains air into the housing 202. A mixture of fuel gas and air is formed in the housing 202 and conducted into the pre-mix membrane 192. The pre-mix unit 190 can be used to inject a pre-mix stream of primary stage fuel gas and air around the perimeter of the interior surface 66 of the wall 58 of the burner tile 50.

The pre-mix unit 190 can serve as the total pre-mix primary or a partial pre-mix with the rest made up with diffusion primary fuel gas. The pre-mix can be fixed heat release or modulated heat release like the rest of the burner. The pre-mix unit 190 delivers the fuel symmetrically around the inside perimeter of the wall 58 of the tile 50 for enhanced turndown and stability. It also helps reduce nitrous oxide emissions due to the homogenous delivery of air and fuel gas which reduces the basal core temperature that would typically be observed with a diffusion type free jet. When the pre-mix unit 190 is utilized in conjunction with a diffusion approach, the diffusion jets can be run much more dilute, and/or detached, as the diffusion flame will then be flame stabilized by the pre-mix flame, which is lean. Since the diffusion jets are flame stabilized, the gas circulation ports 70 can be increased in flow area to a point in excess of six (6) times what would normally be achievable without negatively impacting flame stability (the flame is stabilized by the pre-mix flame from the pre-mix unit). The pre-mix unit can be held at a constant heat release. This allows this zone to be designed such that flashback is not a problem over the range of fuels. This allows not only enhanced turndown due to flame stabilization, but also ensures that a lower primary is achieved while maintaining acceptable port sizing. This means a primary zone heat release can be achieved with as little as one percent (1%) of the total fuel in the primary zone. Due to the larger gas circulation ports, carbon monoxide (CO) emissions can be minimized during cold startup scenarios. The appreciably larger gas circulation ports pull significant flue gases into the burner where the CO is re-burned to reduce the fractions of CO observed in the furnace box.

The pre-mix unit 190 also supplies an ignition source for the remaining burner combustion zones. It can take many shapes and port quantities as required for the specific application. It can be adjusted by design to generate a fuel gas-air mixture that is as lean as necessary to further reduce nitrous oxide emissions. The premix unit 190 serves as the minimum heat release for the burner such that a low heat release decoking cycle can be accomplished if necessary without affecting flame stability. The main gas delivery components can be turned off with the exception of the pre-mix unit. It then serves to deliver a very small heat release while maintaining stability. When the main portion of the burner is relit, the pre-mix unit can then be brought back on-line at very low pressures, much lower than would be typically possible.

The secondary fuel gas injection means 162 includes a plurality of outer gas risers, each connected to a source of fuel gas and having a secondary fuel gas discharge nozzle (including one or more ports therein) connected thereto. The secondary fuel gas injection means serves to inject secondary stage fuel gas on or adjacent to the exterior surface 68 (for example, the external Coanda surface(s) 130) of the wall 58 of the burner tile 50. The secondary stage fuel gas is preferably injected directly on to the exterior surface 68 (for example, the external Coanda surface(s) 130). Various configurations of risers and nozzles can be utilized. For example, as shown by FIGS. 1, 4 and 4A, the outer gas risers and secondary fuel gas discharge nozzles of the secondary fuel gas injection means are also the outer gas risers 164 and nozzles 166 of the primary fuel gas injection means. The nozzles 166 include both primary ports that inject primary fuel gas into the gas circulation ports 70 and secondary ports that inject secondary stage fuel gas on or adjacent to the exterior surface 68 (for example, the external Coanda surface(s) 130) of the wall 58 of the burner tile 50. In another configuration, each outer gas riser 164 includes separate primary fuel gas discharge nozzles and secondary fuel gas discharge nozzles. In yet another configuration, as shown by FIG. 10, the primary fuel gas injection means and secondary fuel gas injection means utilize separate outer gas risers. A plurality of outer gas risers 164, each connected to a source of fuel gas and having an outer primary fuel gas discharge nozzle 166 (including one or more gas ports therein) connected thereto, are used to inject primary fuel gas through the gas circulation ports 70 into the central opening 52 of the burner tile 50. Separate outer gas risers 214, each connected to a source of fuel gas and having a secondary fuel gas discharge nozzle 216 (including one or more gas ports therein) connected thereto, are used to inject secondary stage fuel gas on or adjacent to the exterior surface 68 (for example, the external Coanda surface(s) 130) of the wall 58 of the burner tile 50. The particular riser configuration utilized will depend on the amount of gas staged, and the shape required of the flame.

Figure 20:
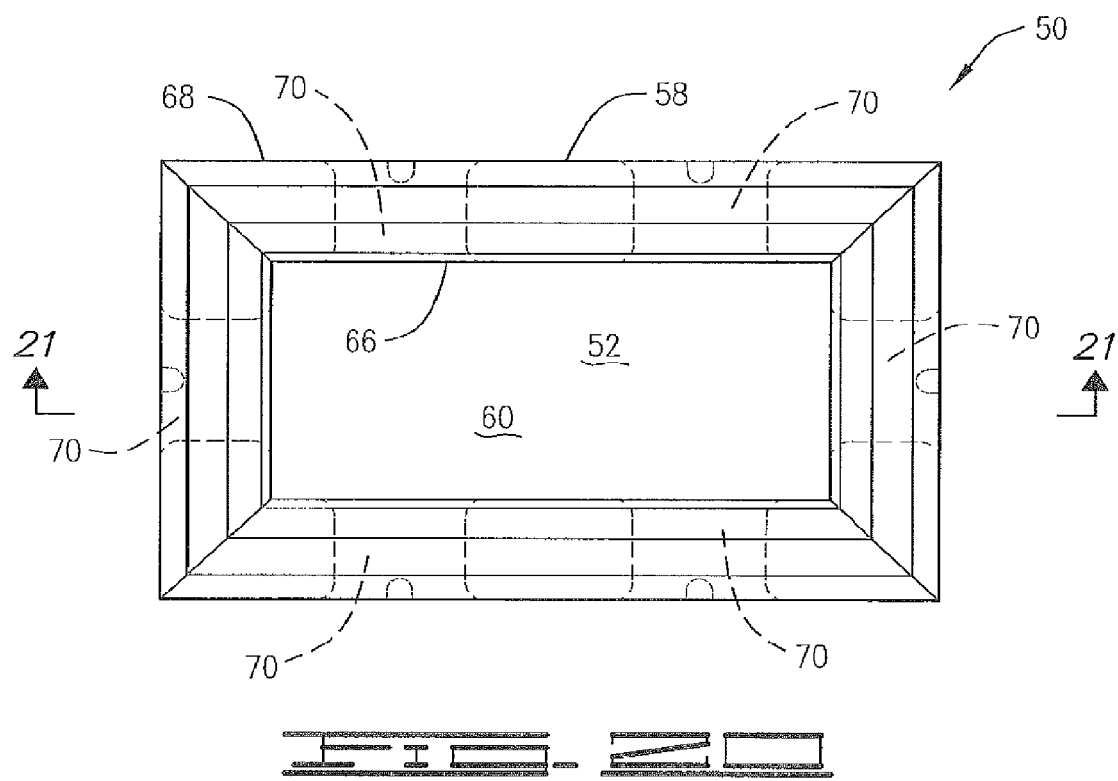
FIG. 20 is a section view illustrating yet another embodiment of the inventive burner tile.

The burner housing 22 and burner tile 50 preferably have circular or round cross-sectional shapes as shown in the drawings. However, the housing 22 and burner tile 50 can have other shapes as well. For example, the housing 22 and burner tile 50 can have an elliptical, square or rectangular cross-sectional shape. The shape can be symmetrical or non-symmetrical as long as the Coanda surfaces are employed correctly. The shape of the housing 22 does not need to be the same as the shape of the burner tile 50. FIGS. 20 and 21 illustrate a burner tile 50 having a rectangular cross-sectional shape. The rectangular burner tile 50 can be used to generate a flat flame and is useful in wall fired type applications, for example.

As shown by FIG. 1, except for the pre-mix unit 190, the various components of the primary fuel gas injection means 160 and secondary fuel gas injection means 162 are connected to a burner gas header 217 which is in turn connected to a source of fuel gas (for example, the overall furnace header). The gas burner header 217 includes a header inlet 218 and a plurality of header outlets 219 and associated header valves 220. The pre-mix unit 190, specifically the inner gas risers 198 thereof are preferably directly connected to a separate source of fuel gas (for example, from the overall furnace gas header). The risers 198 are typically interconnected by a conduit 220 which is connected to the separate source of fuel gas. The conduit 220 has a valve 222 disposed therein for controlling the flow rate of fuel gas through the conduit. Connection of the pre-mix unit 190 to an independent source of fuel allows the pre-mix unit 190 to be operated at a fixed pressure while serving as the burner primary. It also allows the flow rate of the mixture of fuel gas and air from the pre-mix unit to be increased to a point such that it is not necessary to inject primary fuel gas though the gas circulation ports 70 if such a configuration is needed. If desired, the pre-mix unit can also be connected to the burner gas header 218 with merely a separate connector.

As shown by FIG. 9, the gas burner apparatus 10 can also comprise conventional pilot means 223 for igniting the primary fuel gas in the burner tile 50. The pilot means 223 includes an inner gas riser 226 attached to a source of fuel gas, a venturi mixer 228 attached to the inner gas riser and a gas tip 230 (including one or more ports therein) attached to the venturi mixer. The gas tip 230 extends into the central opening 52 of the burner tile. A shield 232 is positioned around the gas tip to stabilize the pilot flame by ensuring the proper stoichiometry by adding additional air and protection to the flame. As shown by the arrows in FIG. 9, air is drawn in through the ports in the shield 232. The flame is discharged out of the top of the shield.

As stated above, the particular configuration of the gas burner apparatus 10 including the configuration of the burner tile 50 and the set ups of the primary and secondary fuel gas injection means 160 and 162 can vary depending on the application. In most instances, both the internal Coanda surfaces 80 and external Coanda surfaces(s) 130 will be utilized. Regardless of the particular configuration utilized, the intent is to mix a great deal of flue gas with the fuel gas and air without negatively impacting the stability of the flame. The Coanda surfaces allow a new tool to be applied to flue gas entrainment and mixing, flame shaping and gas delivery. The enhanced mixing provided by the Coanda surfaces results in improved heat flux, enhanced flame quality and enhanced heat delivery to the bottom of the furnace (flux). The staged fuel and secondary combustion zone serves to reduce emissions of nitrous oxides and allows the flame to be shaped. A tight gas diameter can now be applied by making use of appropriate surface curvatures to deliver the flame shape required or needed. The stabilizing mechanism of the Coanda surfaces allows that the burner be lit successfully at much lower rates of fuel flow. This design also allows that the diffusion primary tips be located somewhat deeper in the furnace for expanded entrainment lengths. Previous designs would not allow a longer entrainment length be utilized without instabilities being realized. The use of the Coanda surfaces allows that the inner boundary layer remain rich enough to remain combustible. The addition of the lean premix ring or distribution header allows that the diffusion primaries be further flame stabilized by a low $NO_x$ homogenous flame. The premix flame allows that the burner turndown be pushed beyond typical designs without instability being realized. It also allows that the burner be highly stable when other burners have been observed to become unstable. The combination of the above geometries allows the designer of the burner to design a burner of medium range $NO_x$, low $NO_x$, or very low $NO_x$ within the same basic burner configuration. The stability of the burner is substantially superior to typical natural draft or forced draft process burners, allowing the Coanda surfaces to add additional flue gas into the primary flame zone. Turndown for the burner can now be in excess of 10 to 1 depending on the fuel and the operational parameters of the burner.

The overall size of the gas burner apparatus in general including the size of the burner tile 50 can also vary depending on how the apparatus is used. Also, as discussed above, the shape, size, length, height and orientation of the internal and external Coanda surfaces can be adjusted as needed as long as certain other parameters (e.g., a sufficient curvature) are maintained to achieve a sufficient Coanda effect.

In some applications, the burner tile 50 can be retrofit to existing burner plenums. For example, the burner tile 50 can be retrofitted to gas burner apparatus of staged gas design. The burner tile 50 can be added with new tips and risers to make use of the Coanda approach for decreased emissions and flame stability. Nitrous oxides can be decreased in a hot furnace while carbon monoxide can be decreased in a cold box or during start up.

As shown by FIGS. 22 and 23, the present invention also includes a Coanda gas tip. The tip can be used, for example, as a primary fuel gas discharge nozzle 168 in connection with the central gas gun 170 (as the bull nose tip) or central venturi mixer 176. It can also be used as a primary or secondary fuel gas discharge nozzle, or the pilot gas tip 230. FIG. 22 illustrates use of the Coanda gas tip as a pilot gas tip.

The inventive Coanda gas tip, generally designated in FIGS. 22 and 23 by the reference numeral 240, includes a gas barrel 242 for connection to a source of fuel gas (a gas riser, for example), a gas deflector 244 attached to the gas barrel, and a fuel gas outlet 246 disposed between the gas barrel and the gas deflector. The gas deflector 244 is attached to the barrel 242 by an internal threaded connection assembly 248 (other mechanical or welded connections can be used as well). The gas deflector 244 has an exterior surface that includes a Coanda surface 250 positioned with respect to the fuel gas outlet 246 such that fuel gas discharged from the fuel gas outlet follows the path of the Coanda surface. The gas deflector 244 of the Coanda gas tip 240 preferably has a tulip shape which imparts an annular Coanda surface 250 to the deflector.

In order to achieve a significant Coanda effect, the surface of the Coanda surface 250 should be substantially smooth and have a substantially true radius or uniform arc. Also, it is important for the Coanda surface 250 to have enough curvature to sufficiently attract the gas stream at issue. If the Coanda surface does not have enough curvature or surface area, the surface may not have a sufficient area to initiate the Coanda effect due to the momentum of the gas (i.e., the gas stream may not be drawn to the surface). In order to assure a sufficient Coanda effect, the ratio of the diameter of the ports of the fuel gas outlet 246 (if ports are used), or the width of the slots of the fuel gas outlet 246 (if slots are used) (or the average port diameter or slot width if multiple ports or slots are used) (the "tip discharge opening diameter") to the radius of the Coanda surface 250 (the "tip Coanda radius") needs to be at least 7:1. Preferably the tip discharge opening diameter to tip Coanda radius ratio is at least 10:1, most preferably at least 12:1. Assuming that the Coanda surface 250 has enough curvature or surface area, the gas stream or jet is aligned to be tangent with the curvature of the Coanda surface to initiate a proper Coanda effect, even when dealing with small gas ports.

In one embodiment, the fuel gas outlet 246 comprises an annular slot 252 which discharges the fuel gas at an appropriate angle (for example, 0 to 45°) from the barrel 242, depending on the particular application. The fuel gas outlet 246 can also comprise a plurality of small circular ports (not shown), either in lieu of the slot 252 or in addition thereto. As shown by FIG. 22, in pilot and other applications in which flame stability is an issue or enhanced mixing is required, a shield 254 can be attached to the barrel 242 to surround the deflector 244 and outlet 246. The shield 254 includes one or more air inlets 260 therein.

The annular Coanda surface 250 of the Coanda gas tip 240 is positioned with respect to the fuel gas outlet 246 such that fuel gas discharged from the fuel gas outlet follows the path of the Coanda surface. The Coanda surface spreads the fuel gas into a thin film allowing more air or flue gas or both to be entrained into the fuel gas stream and create a small rapidly mixed three fluid mixture with a fuel rich inner boundary layer for stability. This approach allows the bulk flame to approach non-combustibility while maintaining a stable flame. The amount of flue gas that can be entrained into the fuel gas stream can be appreciably increased without compromising stability. The overall size of the Coanda gas tip 240 including the length and diameter of the barrel 242 and the size of the deflector 244 can vary depending on the size of the overall burner and the way the tip is used. For example, when the tip is used as the bull nose tip 168 of the central gas gun 170, it is relatively large as compared to its size when it is used as the pilot tip 230. A smaller size of the tip is typically used when dealing with heat releases of from about 0.05 to about 1.5 MMBtuh. A larger scale can be used to deliver significantly more fuel gas, for example when the tip is used as the main injector in the center of the tile (the tip of the central gas gun 170). In this case, the tip can deliver, for example, 3 to 10 million MMBtuh or more if required by the particular application. The cone and other superfluous components typically used in a gas gun are not necessary.

Referring now to FIG. 1, operation of the inventive gas burner apparatus 10 will be described. The apparatus 10 is initially lit by an internal pilot or manually ignited by an external torch. Once the pre-mix primary unit 190 is ignited and up and running, the various header valves 220 are opened to supply fuel gas to the remaining burner components. Air is introduced into the burner housing 22 through the air inlet 32 thereof. The air register or damper 42 regulates the rate of flow of the air into the housing 22. The air is conducted through the housing 22 and discharged through the air outlet 30 thereof into the central opening 52 of the burner tile 50.

A mixture of primary fuel gas and air is introduced into the central opening 52 of the burner tile 50 by the pre-mix unit 190. The fuel gas-air mixture is discharged through the premix gas ports 194 around the interior surface 66 of the wall 58 of the burner tile. Primary fuel gas is also injected into the central opening 52 of the burner tile 50 by the central gas gun 170. The flow of fuel gas and combustion air is represented by the arrows in the drawings. Simultaneously, primary fuel gas is conducted through the outer gas risers 164 and discharged through the primary fuel gas discharge nozzles 166 into and through the gas circulation ports 70. Injection of fuel gas from the primary fuel gas discharge nozzles 166 into the gas circulation ports 70 entrains flue gas from the furnace into the central opening 52 of the burner tile 50. The primary fuel gas and flue gas transported through the ports 70 encounter the internal Coanda surfaces 80 and follow the path thereof to the top end 56 of the burner tile. As stated above, the internal Coanda surfaces 80 cause the fuel gas and flue gas to rapidly mix together and keep the mixture close to the interior surface 66 of the wall 58 of the burner tile 50 which allows a great deal of flue gas to be entrained into the central opening for controlling the temperature of the flame and thereby controlling the emission of nitrous oxides and carbon monoxide without overly diluting the fuel gas in the central opening 52 (for example, to the point on non-combustibility). The mixture of primary fuel gas, air and flue gas is ignited by the pre-mix unit 190 (or other pilot means) in the central opening 52, discharged through the discharge outlet 60 and burned in a primary reaction zone 270. The primary reaction zone 270 is inside the central opening 52 of the burner tile 50 and outside of burner tile adjacent to the discharge outlet 60 thereof.

Secondary stage fuel gas is simultaneously conducted through the outer gas risers 164 and discharged through the secondary fuel gas discharge nozzles 168 (which can also be the primary fuel gas discharge nozzles) on or adjacent to the continuous external Coanda surface 130. The secondary stage fuel gas follows the path of the external Coanda surface 130 to the top end 56 of the burner tile where it is ignited by the flame in the primary combustion zone 170 and is burned in a secondary combustion zone 280 around and on top of the primary combustion zone. The flow of fuel gas and flue gas with respect to the internal and external Coanda surfaces 80 and 130 is best shown by FIGS. 4 and 4A. FIG. 4A illustrates the flow of gas when the circulation choke means 87 are utilized to abate the outflow of fluids through the gas circulation ports 70.

As shown by FIG. 8, the central venturi mixer 176 can be substituted for the central gas gun 170 to serve as a quench mechanism for lower nitrous oxide emissions and also to create a shorter flame. As shown by FIG. 9, a plurality of inner gas risers 167 and corresponding fuel gas discharge nozzles 168 can be used instead of or in conjunction with the pre-mix unit 190. The circulation choke means is typically needed when inner gas risers 167 and nozzles 168 are placed adjacent to the gas circulation ports 70 and diffusion fuel gas is not injected through the ports. As shown by FIGS. 11-16, various configurations of the wall 58 and exterior surface 68 (for example, a plurality of external Coanda surfaces 130 separated by inclined external planar surfaces 132 or a continuous external planar surface 132) can be utilized to achieve a smaller diameter flame and help control the flame. As shown by FIG. 16-19, the lip 140 can be included in the burner tile 50 to offer additional mixing as well as bluff body stabilization. Finally, different shapes of the gas burner apparatus 10 can be utilized to fit the particular application.

Fuel gas is burned in the furnace space 14 at a flow rate which results in the desired heat release. The rate of air is introduced into the housing 22 by way of the air inlet 32 and air register or damper 42 such that the desired stoichiometric mixture of fuel gas and air results in the furnace space 14. That is, a flow rate of air is introduced into the furnace space 14 relative to the total flow rate of fuel gas introduced thereinto which results in a fuel-air ratio greater than the stoichiometric mixture. Preferably, the rate of air is in the range of about 10% to about 25% greater than the stoichiometric rate. The flue gases formed by combustion of the fuel gas in the furnace space 14 have a very low content of nitrous oxides. The portion of the fuel gas which is used as primary fuel gas is generally in the range of about 5% to about 25% by volume of the total fuel gas discharged by the burner apparatus 10 into the furnace space 14. That is, the flow rate of primary fuel gas discharged into the furnace space is from about 5% to about 25% of the total fuel gas flow rate delivered to the burner apparatus 10 and the flow rate of secondary stage fuel gas discharged is from about 95% to about 75% of the total fuel gas flow rate. The primary fuel gas is mixed with flue gases in an amount in the range of from about 1 volume to about 30 volumes of flue gas per volume of the primary fuel gas depending on available pressure, entrainment length, and the size of the gas circulation ports 70. Staged gas can be biased to almost any percentage between the primary ports and the staged riser staged ports to optimize heat flux. The heat release of the burner in question will dictate for the most part the splits utilized between different risers.

In a preferred embodiment, both the internal Coanda surfaces 80 and external Coanda surface(s) 130 are utilized. The primary fuel gas injection means include the outer gas risers 164 and the pre-mix unit 190. That is, primary fuel gas is injected into the burner tile 50 through the gas circulation ports 70 and above the pre-mix unit 190. In another preferred embodiment, both the internal Coanda surfaces 80 and external Coanda surface(s) 130 are utilized. However, the primary fuel gas injection means could consist of only the pre-mix unit 190. That is, the only source of primary fuel gas is the pre-mix unit 190. The discharge of fuel gas and air from the pre-mix unit 190 and the flow of air through the central opening 52 would still entrain flue gas into the gas circulation ports 80 into the central opening even though primary fuel gas is not injected through the gas circulation ports. Flue gas entrained by air flow through the burner will still flow through the recirculation ports in the tile after which a large portion of the flue gas will adhere to the Coanda surface located on the inside.

The invention also provides a method of burning a mixture of air and fuel gas in the presence of flue gas in a furnace to generate heat in the furnace. The method includes the following steps:

First, the inventive gas burner apparatus is installed through a wall of the furnace space (preferably, the bottom wall or floor of the furnace space). As described above, a plurality of gas circulation ports 70 extend through the wall 58 of the burner tile 50. The interior surface 66 of the wall 58 includes a plurality of internal Coanda surfaces 80, each internal Coanda surface being positioned adjacent to the gas circulation port 70. Depending on the application, the gas burner apparatus 10 can also include one or more of the other components described above.

Air is injected into the central opening 52 of the burner tile 50. Primary fuel gas is injected through the gas circulation ports 70 on or adjacent to the internal Coanda surfaces 80 to entrain flue gas from outside of the wall 58 (for example, from the furnace space) into the central opening 52 of the burner tile 50 and form a homogenous mixture of air, fuel gas and flue gas in the central opening. The mixture of air, fuel gas and flue gas is discharged from the discharge outlet 60 of the top end 56 of the burner tile 50 into the furnace space 14, and the mixture of air and fuel gas is burned in the furnace space while heavily diluted with the furnace flue gas.

In another embodiment, the method of burning a mixture of air and fuel gas in the presence of flue gas in a furnace to generate heat in the furnace comprises the following steps:

The inventive gas burner 10 is installed through a wall of the furnace space 14 (preferably a bottom wall or floor of the furnace space 14). The exterior surface 68 of the wall 58 of the burner tile 50 includes an external Coanda surface 130 which extends outwardly from the exterior surface.

Air and fuel gas are injected into the central opening 52 of the burner tile 50 whereby a mixture of air and fuel gas is formed in the central opening. The mixture of air and fuel gas is then discharged from the discharge outlet 60 of the burner tile 50 into the furnace space 14, and the mixture is burned in a primary reaction zone 270 in the furnace space. Staged fuel gas is also injected on or adjacent to the external Coanda surface 130 in a manner that entrains flue gas from the furnace space 14 to create a staged fuel gas/flue gas mixture and causes the staged fuel gas/flue gas mixture to burn in a secondary reaction zone 280 in the furnace space.

If desired, the steps of the methods described above can be combined into a single method.

In order to further illustrate the invention, the following example is provided.

EXAMPLE

The inventive gas burner apparatus 10 was tested for performance. The internal Coanda surfaces 80 and a continuous Coanda surface 130 were included on the wall 58 of the burner tile 50. The primary fuel gas injection means in the particular burner configuration tested included the outer gas risers 164 and fuel gas discharge nozzles 166. The fuel gas discharge nozzles included both ports for injecting primary fuel gas through the gas circulation ports 80 and ports for injecting secondary fuel gas on or adjacent to the external Coanda surface 130. The pre-mix unit 190 was also utilized to reduce nitrous oxide emissions. The pre-mix membrane 192 included 36 pre-mix gas ports 194 that had a 0.261 inch diameter. These ports were spaced around the top surface of the pre-mix membrane 192. Each 0.261 inch port had a 0.125 inch port located between it that was also counter-bored with a 0.125 inch diameter port superimposed over it. The purpose of the smaller ports was to serve as an ignition port which was utilized to tie together the larger ports. Neither inner gas risers 167, the central gas gun 170 nor the central venturi mixer 176 were utilized. Generally, the gas burner apparatus 10 tested was configured like the gas burner apparatus 10 shown in FIGS. 1-7 except the central gas gun 170 was not included.

The pre-mix unit was manually ignited followed by the ignition of the rest of the burner. The damper 42 was left all the way open during all test points. The pre-mix primary unit lit nicely creating a uniform set of blue flamelets around the internal perimeter of the burner tile. The main portion of the burner was then lit with a pressure of approximately 0.1 psig. The burner was then increased in heat release to roughly 0.84 MMBtuh to start warming the furnace. The flame was stiff and appeared very stable. Carbon monoxide and nitrous oxide levels were very good at all test points maintaining recordable emissions of less than 26 ppmv (avg) from light off to saturation. The burner tile 50 was observed to be glowing red through all the testing.

The following test data was generated.

Test Data

| Heat Release | 0.85 MMBtuh |
|---|---|
| Tip Pressure | 0.4 psig |
| Fuel Gas | 100% TNG* |
| Spud Size | #52 MTD |
| Pre-Mix Gas | — |
| $NO_X$ Emissions | 5.31 ppmv |
| CO Emissions | 34.80 ppmv |
| Percent O2 | 18.63% |
| Flame Quality | very good |
| Mixer type | Std. Brnr. Pilot |
| Pre-mix Tip (Large Ports) | 0.261" |
| Pre-mix Tip (Small Ports) | 0.125" |
| Furnace Floor Temp | 336° F. |
| Furnace Temp | 384° F. |

*Tulsa Natural Gas

| Heat Release | 2.07 MMBtuh |
|---|---|
| Tip Pressure | 2.6 psig |
| Fuel Gas | 100% TNG* |
| Spud Size | #52 MTD |
| Pre-Mix Gas | — |
| $NO_X$ Emissions | 11.2 ppmv |
| CO Emissions | 9.04 ppmv |
| Percent O2 | 16.15 |
| Flame Quality | very good |
| Mixer type | Std. Brnr. Pilot |
| Pre-mix Tip (Large Ports) | 0.261" |
| Pre-mix Tip (Small Ports) | 0.125" |
| Furnace Floor Temp | 683° F. |
| Furnace Temp | 717° F. |

*Tulsa Natural Gas

| Heat Release | 3.0 MMBtuh |
|---|---|
| Tip Pressure | 5.4 psig |
| Fuel Gas | 100% TNG* |
| Spud Size | #52 MTD |
| Pre-Mix Gas | — |
| $NO_X$ Emissions | 12.42 ppmv |
| CO Emissions | 12.33 ppmv |
| Percent O2 | 14.38% |
| Flame Quality | very good |
| Mixer type | Std. Brnr. Pilot |
| Pre-mix Tip (Large Ports) | 0.261" |
| Pre-mix Tip (Small Ports) | 0.125" |
| Furnace Floor Temp | 859° F. |
| Furnace Temp | 893° F. |

*Tulsa Natural Gas

| Heat Release | 4.00 MMBtuh |
|---|---|
| Tip Pressure | 9.4 psig |
| Fuel Gas | 100% TNG* |
| Spud Size | #52 MTD |
| Pre-Mix Gas | — |
| $NO_X$ Emissions | 10.19 ppmv |
| CO Emissions | 26.62 ppmv |
| Percent O2 | 12.56% |
| Flame Quality | very good |
| Mixer type | Std. Brnr. Pilot |
| Pre-mix Tip (Large Ports) | 0.261" |
| Pre-mix Tip (Small Ports) | 0.125" |
| Furnace Floor Temp | 1015° F. |
| Furnace Temp | 1036° F. |

*Tulsa Natural Gas

| Heat Release | 4.97 MMBtuh |
|---|---|
| Tip Pressure | 15.3 psig |
| Fuel Gas | 85% TNG* and 15% H2 |
| Spud Size | #52 MTD |
| Pre-Mix Gas | — |
| $NO_X$ Emissions | 9.95 ppmv |
| CO Emissions | 10.99 ppmv |
| Percent O2 | 10.22% |
| Flame Quality | very good |
| Mixer type | Std. Brnr. Pilot |
| Pre-mix Tip (Large Ports) | 0.261" |
| Pre-mix Tip (Small Ports) | 0.125" |
| Furnace Floor Temp | 1138° F. |
| Furnace Temp | 1161° F. |

*Tulsa Natural Gas

| Heat Release | 6.01 MMBtuh |
|---|---|
| Tip Pressure | 20.9 psig |
| Fuel Gas | 85% TNG*/15% H2 |
| Spud Size | #52 MTD |
| Pre-Mix Gas | — |
| $NO_X$ Emissions | 10.74 ppmv |
| CO Emissions | 9.30 ppmv |
| Percent O2 | 8.12% |
| Flame Quality | Very good |
| Mixer type | Std. Brnr. Pilot |
| Pre-mix Tip (Large Ports) | 0.261" |
| Pre-mix Tip (Small Ports) | 0.125" |
| Furnace Floor Temp | 1216° F. |
| Furnace Temp | 1256° F. |

*Tulsa Natural Gas

| Heat Release | 6.50 MMBtuh |
|---|---|
| Tip Pressure | 23.6 psig |
| Fuel Gas | 85% TNG*/15% H2 |
| Spud Size | #52 MTD |
| Pre-Mix Gas | — |
| $NO_X$ Emissions | 12.99 ppmv |
| CO Emissions | 1.10 ppmv |
| Percent O2 | 7.01% |
| Flame Quality | Very good |
| Mixer type | Std. Brnr. Pilot |
| Pre-mix Tip (Large Ports) | 0.261" |
| Pre-mix Tip (Small Ports) | 0.125" |
| Furnace Floor Temp | 1242° F. |
| Furnace Temp | 1322° F. |

*Tulsa Natural Gas

| Heat Release | 7.04 MMBtuh |
|---|---|
| Tip Pressure | 26.7 psig |
| Fuel Gas | 85% TNG*/15% H2 |
| Spud Size | #52 MTD |

-continued

| | |
|---|---|
| Pre-Mix Gas | — |
| NO$_X$ Emissions | 13.66 ppmv |
| CO Emissions | 0.00 ppmv |
| Percent O2 | 5.63% |
| Flame Quality | Very good |
| Mixer type | Std. Brnr. Pilot |
| Pre-mix Tip (Large Ports) | 0.261" |
| Pre-mix Tip (Small Ports) | 0.125" |
| Furnace Floor Temp | 1271° F. |
| Furnace Temp | 1367° F. |

*Tulsa Natural Gas

| | |
|---|---|
| Heat Release | 7.28 MMBtuh |
| Tip Pressure | 28.1 psig |
| Fuel Gas | 85% TNG*/15% H2 |
| Spud Size | #52 MTD |
| Pre-Mix Gas | — |
| NO$_X$ Emissions | 13.37 ppmv |
| CO Emissions | 0.00 ppmv |
| Percent O2 | 4.68% |
| Flame Quality | Very good |
| Mixer type | Std. Brnr. Pilot |
| Pre-mix Tip (Large Ports) | 0.261" |
| Pre-mix Tip (Small Ports) | 0.125" |
| Furnace Floor Temp | 1283° F. |
| Furnace Temp | 1376° F. |

*Tulsa Natural Gas

| | |
|---|---|
| Heat Release | 7.98 MMBtuh |
| Tip Pressure | 31.9 psig |
| Fuel Gas | 85% TNG*/15% H2 |
| Spud Size | #52 MTD |
| Pre-Mix Gas | — |
| NO$_X$ Emissions | 11.32 ppmv |
| CO Emissions | 0.00 ppmv |
| Percent O2 | 2.56% |
| Flame Quality | Very good |
| Mixer type | Std. Brnr. Pilot |
| Pre-mix Tip (Large Ports) | 0.261" |
| Pre-mix Tip (Small Ports) | 0.125" |
| Furnace Floor Temp | 1294° F. |
| Furnace Temp | 1469° F. |

*Tulsa Natural Gas

| | |
|---|---|
| Heat Release | 8.10 MMBtuh |
| Tip Pressure | 32.4 psig |
| Fuel Gas | 85% TNG*/15% H2 |
| Spud Size | #52 MTD |
| Pre-Mix Gas | — |
| NO$_X$ Emissions | 10.82 ppmv |
| CO Emissions | 0.00 ppmv |
| Percent O2 | 1.93% |
| Flame Quality | Very good |
| Mixer type | Std. Brnr. Pilot |
| Pre-mix Tip (Large Ports) | 0.261" |
| Pre-mix Tip (Small Ports) | 0.125" |
| Furnace Floor Temp | 1286° F. |
| Furnace Temp | 1475° F. |

*Tulsa Natural Gas

| | |
|---|---|
| Heat Release | 8.33 MMBtuh |
| Tip Pressure | 34.0 psig |
| Fuel Gas | 85% TNG*/15% H2 |

-continued

| | |
|---|---|
| Spud Size | #52 MTD |
| Pre-Mix Gas | — |
| NO$_X$ Emissions | 10.24 ppmv |
| CO Emissions | 0.00 ppmv |
| Percent O2 | 2.08% |
| Flame Quality | Very good |
| Mixer type | Std. Brnr. Pilot |
| Pre-mix Tip (Large Ports) | 0.261" |
| Pre-mix Tip (Small Ports) | 0.125" |
| Furnace Floor Temp | 1282° F. |
| Furnace Temp | 1499° F. |

*Tulsa Natural Gas

| | |
|---|---|
| Heat Release | 8.58 MMBtuh |
| Tip Pressure | 35.1 psig |
| Fuel Gas | 85% TNG*/15% H2 |
| Spud Size | #52 MTD |
| Pre-Mix Gas | — |
| NO$_X$ Emissions | 10.34 ppmv |
| CO Emissions | 0.00 ppmv |
| Percent O2 | 0.67% |
| Flame Quality | Very good |
| Mixer type | Std. Brnr. Pilot |
| Pre-mix Tip (Large Ports) | 0.261" |
| Pre-mix Tip (Small Ports) | 0.125" |
| Furnace Floor Temp | 1282° F. |
| Furnace Temp | 1532° F. |

*Tulsa Natural Gas

| | |
|---|---|
| Heat Release | 8.62 MMBtuh |
| Tip Pressure | 35.3 psig |
| Fuel Gas | 85% TNG*/15% H2 |
| Spud Size | #52 MTD |
| Pre-Mix Gas | — |
| NO$_X$ Emissions | 9.71 ppmv |
| CO Emissions | 2.44 ppmv |
| Percent O2 | 0.37% |
| Flame Quality | Very good |
| Mixer type | Std. Brnr. Pilot |
| Pre-mix Tip (Large Ports) | 0.261" |
| Pre-mix Tip (Small Ports) | 0.125" |
| Furnace Floor Temp | 1284° F. |
| Furnace Temp | 1537° F. |

*Tulsa Natural Gas

| | |
|---|---|
| Heat Release | 8.65 MMBtuh |
| Tip Pressure | 35.3 psig |
| Fuel Gas | 85% TNG*/15% H2 |
| Spud Size | #52 MTD |
| Pre-Mix Gas | — |
| NO$_X$ Emissions | 9.22 ppmv |
| CO Emissions | 131.8 ppmv |
| Percent O2 | 0.15% |
| Flame Quality | Good |
| Mixer type | Std. Brnr. Pilot |
| Pre-mix Tip (Large Ports) | 0.261" |
| Pre-mix Tip (Small Ports) | 0.125" |
| Furnace Floor Temp | 1283° F. |
| Furnace Temp | 1501° F. |

*Tulsa Natural Gas

Thus, the inventive gas burner apparatus performed very well. The pre-mix unit 190 worked well. The carbon monoxide observed during light off, warm up and stable running was for the most part non-existent. Nitrous oxide emissions were also observed to be very low.

What is claimed is:

1. A burner tile for use in association with a burner plenum to form a gas burner apparatus for discharging a mixture of fuel gas and air into a furnace wherein the mixture is burned in the presence of flue gas while producing a low content of nitrous oxides, wherein the burner plenum includes a housing for attachment to the furnace that includes an upper end having an air outlet disposed therein, said burner tile is made of a heat and flame resistant refractory material and has a central opening therein for receiving air from the outlet of the plenum housing and comprising:
   a bottom end attachable to the upper end of the plenum housing over the air outlet disposed therein;
   a top end opposing said bottom end, said top end including a discharge outlet; and
   a wall connecting said bottom end to said top end and surrounding said central opening, said wall extendable into said furnace and having an interior surface, an exterior surface and at least one gas circulation port extending through said wall from said exterior surface to said interior surface, said interior surface of said wall including an internal Coanda surface which bulges into said central opening, said burner tile being configured such that fuel can be injected on or adjacent to said internal Coanda surface from outside said central opening through said gas circulation port.

2. The burner tile of claim 1 wherein said internal Coanda surface is positioned on said interior surface of said wall adjacent to said gas circulation port.

3. The burner tile of claim 2 wherein said interior surface of said wall of said tile includes a recessed section, and said gas circulation port and said internal Coanda surface are positioned in said recessed section.

4. The burner tile of claim 3 wherein said recessed section includes opposing sidewalls extending outwardly from said interior surface into said central opening of said tile, said opposing sidewalls extending further into said central opening than said internal Coanda surface extends into said central opening.

5. The burner tile of claim 1 wherein
   said exterior surface of said wall includes an external Coanda surface which bulges outwardly from said exterior surface.

6. The burner tile of claim 5 wherein said wall of said burner tile includes a plurality of gas circulation ports extending through said wall.

7. The burner tile of claim 6 wherein said interior surface of said wall includes a plurality of internal Coanda surfaces, each of said internal Coanda surfaces bulging into said central opening of said burner tile.

8. The burner tile of claim 7 wherein said exterior surface of said wall of said burner tile includes a plurality of external Coanda surfaces, each of said external Coanda surfaces bulging outwardly from said exterior surface.

9. The burner tile of claim 7 wherein said external Coanda surface extends completely around said exterior surface of said wall of said burner tile.

10. The burner tile of claim 9 wherein said tile has a substantially circular cross-sectional shape.

11. The burner tile of claim 1 further comprising
   a pre-mix membrane extending around the interior surface of said wall for injecting a pre-mixed stream of primary fuel gas and air around the interior surface of said wall and around said central opening, said pre-mix membrane including at least one inlet for connection to a source of fuel gas and air and at least one outlet therein.

12. The burner tile of claim 11 wherein said pre-mix membrane extends around the interior surface of said wall in a manner that allows it to symmetrically inject a pre-mixed stream of primary fuel gas and air around the interior surface of said wall and around said central opening.

13. The burner tile of claim 11 wherein said pre-mix membrane extends continuously around the interior surface of said wall.

14. The burner tile of claim 11 wherein said pre-mix membrane is inset somewhat in the interior surface of said wall of said burner tile.

15. The burner tile of claim 11 wherein said pre-mix membrane includes a plurality of pre-mix gas ports in the top thereof.

16. The burner tile of claim 11 wherein said burner tile and said pre-mix membrane have substantially round cross-sectional shapes.

17. The burner tile of claim 11 wherein said burner tile further comprises a lip transversely extending from said interior surface of said wall into said central opening, said lip being attached to said wall adjacent to said top end of said burner tile and extending around said interior surface of said wall of said burner tile.

18. The burner tile of claim 17 wherein said lip includes a lower end, a top end and a body connecting said lower end and said top end together, said body including a plurality of protrusions extending into said central opening.

19. The burner tile of claim 1 wherein said internal Coanda surface is positioned inside said furnace.

20. The burner tile of claim 1 further comprising a circulation choke positioned in said gas circulation port and which inhibits the flow of air from within said central opening through said gas circulation port to outside of said burner tile.

21. The burner tile of claim 1 wherein said gas circulation port further comprises a ledge and a top surface wherein said ledge is inclined downwardly from said interior surface to said exterior surface.

22. The burner tile of claim 1 wherein said exterior surface of said wall includes an external Coanda surface which bulges outwardly from said exterior surface and said burner tile is configured such that fuel can be injected on or adjacent to said external Coanda surface from outside said central opening.

23. A burner tile for use in association with a burner plenum to form a gas burner apparatus for discharging a mixture of fuel gas and air into a furnace wherein the mixture is burned in the presence of flue gas while producing a low content of nitrous oxides, wherein the burner plenum includes a housing for attachment to the furnace that includes an upper end having an air outlet disposed therein, said burner tile is made of a heat and flame resistant refractory material and has a central opening therein for receiving air from the air outlet of the plenum housing and comprising:
   a bottom end attachable to the upper end of the plenum housing over the air outlet disposed therein;
   a top end opposing said bottom end, said top end including a discharge outlet; and
   a wall connecting said bottom end to said top end and surrounding said central opening, said wall extendable into said furnace and having an interior surface and an exterior surface, said exterior surface of said wall including an external Coanda surface which bulges outwardly from said exterior surface, said burner tile being configured such that fuel can be injected on or adjacent to said external Coanda surface from outside said central opening.

24. The burner tile of claim 23 wherein said exterior surface of said wall of said burner tile includes a plurality of external Coanda surfaces, each of said external Coanda surfaces bulging outwardly from said exterior surface.

25. The burner tile of claim 23 wherein said external Coanda surface extends completely around said exterior surface of said wall of said burner tile.

26. The burner tile of claim 23 wherein said internal Coanda surface is positioned inside said furnace.

* * * * *